United States Patent
Koide et al.

(10) Patent No.: US 6,188,196 B1
(45) Date of Patent: Feb. 13, 2001

(54) ELECTRICAL ANGLE DETECTING APPARATUS AND METHOD, AND MOTOR CONTROL APPARATUS

(75) Inventors: Satoshi Koide, Toyota; Yasutomo Kawabata, Aichi-gun; Eiji Yamada, Owariasahi, all of (JP)

(73) Assignee: Toyota Jidosha Kabushiki Kaisha, Toyota (JP)

( * ) Notice: Under 35 U.S.C. 154(b), the term of this patent shall be extended for 0 days.

(21) Appl. No.: 09/453,693

(22) Filed: Dec. 3, 1999

(30) Foreign Application Priority Data

| Dec. 18, 1998 | (JP) | 10-360200 |
| Apr. 15, 1999 | (JP) | 11-107999 |
| Nov. 1, 1999 | (JP) | 11-311266 |

(51) Int. Cl.[7] .................................... H02P 7/36
(52) U.S. Cl. .................. 318/700; 318/720; 318/721; 318/432; 318/434; 318/439
(58) Field of Search ................... 318/700, 715, 318/717, 720, 721, 722, 724, 432, 433, 437, 439, 254, 434

(56) References Cited

U.S. PATENT DOCUMENTS

| 5,608,300 | * | 3/1997 | Kawabata et al. | 318/721 |
| 5,635,810 | * | 6/1997 | Goel | 318/719 |
| 5,955,860 | * | 9/1999 | Taga et al. | 318/700 |
| 5,969,496 | * | 10/1999 | Yamada et al. | 318/715 |
| 6,025,692 | * | 2/2000 | Yamada et al. | 318/721 |
| 6,037,741 | * | 3/2000 | Yamada et al. | 318/721 |
| 6,051,946 | * | 4/2000 | Yamada et al. | 318/432 |

FOREIGN PATENT DOCUMENTS 7-177788    7/1995  (JP) .

* cited by examiner

Primary Examiner—Robert E. Nappi
Assistant Examiner—Rita Leykin
(74) Attorney, Agent, or Firm—Oliff & Berridge, PLC

(57) ABSTRACT

An electrical angle detecting apparatus determines an electrical angle $\theta$ from voltages Vd, Vq, and currents Id, Iq along a d-axis and a q-axis of a synchronous motor, by using the following expressions:

$$\theta = \theta(n-1) + k1 \times \Delta Id + k2 \times \Sigma(\Delta Id)$$

$$\Delta Id = Id(n) - Id(n-1) - t(Vd - R \times Id(n-1) + \omega \times Lq \times Iq(n-1))/Ld;$$

$$\omega = (k1 \times \Delta Id + k2 \times \Sigma(\Delta Id))/t$$

where (n−1) indicates a value of each variable at the previous timing; (n) indicates a value at the given timing; R is the resistance of a coil; t is the determination executing period; and k1, k2 are coefficients. This determination makes it easier to set appropriate gains, so that precision improves. Furthermore, the amount of determination reduces, and the processing time shortens.

13 Claims, 15 Drawing Sheets

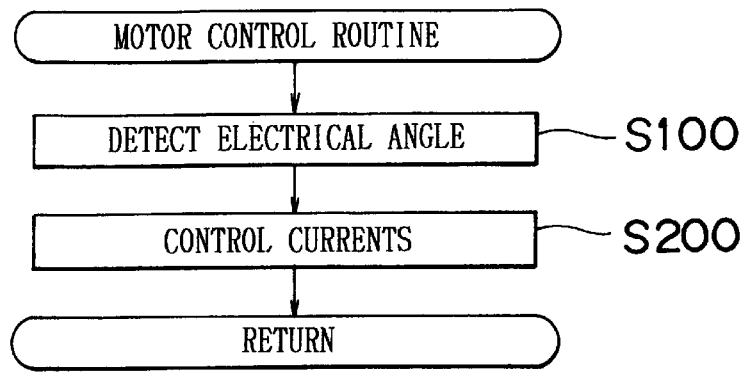
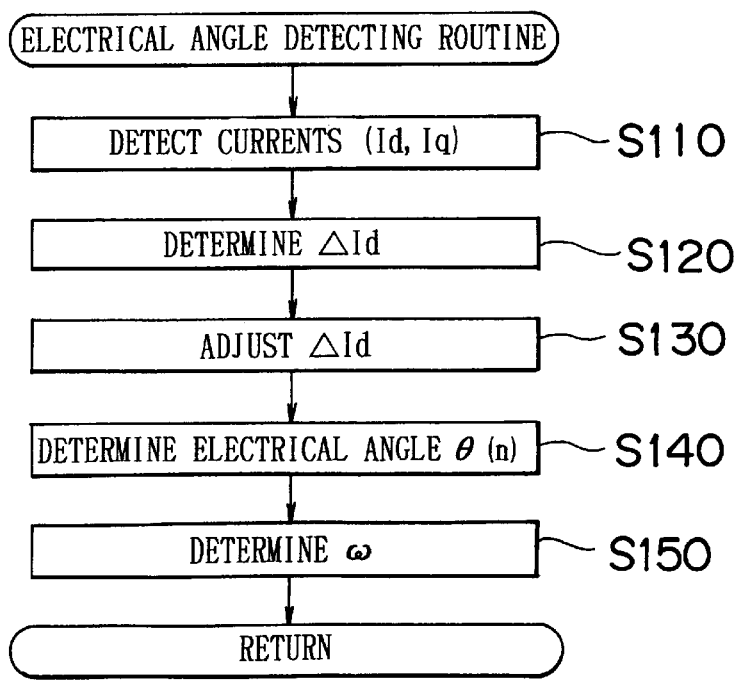

ELECTRICAL ANGLE DETECTING APPARATUS AND METHOD, AND MOTOR CONTROL APPARATUS

INCORPORATION BY REFERENCE

The disclosures of Japanese Patent Application Nos. HEI 10-360200 filed on Dec. 18, 1998 and HEI 11-107999 filed on Apr. 15, 1999, each including the specification, drawings and abstract, are incorporated herein by reference in their entirety.

BACKGROUND OF THE INVENTION

1. Field of the Invention

The present invention relates to an apparatus and a method for detecting an electrical angle of a rotor of a synchronous motor without requiring a particular sensor. The invention also relates to a motor control apparatus for controlling the operation of a synchronous motor by applying the electrical angle detecting apparatus.

2. Description of the Related Art

Various AC motors are used in industrial machines, railway vehicles and the like. Hybrid vehicles employing an AC motor as one of the drive sources have also been proposed. One type of such conventional AC motors is a synchronous motor in which multi-phase alternating currents are caused to flow through windings of the AC motor and a rotor is rotated by interactions between magnetic fields generated by alternating currents flowing through the windings and magnetic fields generated by permanent magnets. In order to achieve a desired rotating torque in a synchronous motor, it is necessary to control the multi-phase alternating currents supplied through the windings in accordance with the position of the rotor, that is, the electrical angle.

Typical methods for detecting the electrical angle use a sensor, such as a Hall device or the like. In such methods, however, the detection precision of the sensor and the reliability thereof against failures become problems in the pursuit of stable operation of the motor. With regard to generally termed salient pole type synchronous motors, a sensor-less detection method has been proposed which detects the electrical angle based on determination described below without requiring the use of a sensor as mentioned above. Since the method does not require a sensor, the method allows an improvement of the reliability against failures.

Among the methods for detecting the electrical angle of a salient pole type synchronous motor without using a sensor, a method that uses the following equations (1), (2) has been proposed for a case where the motor is operated at relatively high rotational speed (hereinafter, simply referred to as "high speed").

$$Vd - R \times Id - p(Ld \times Id) + \omega \times Lq \times Iq = 0 \quad (1)$$

$$Vq - R \times Iq - p(Lq \times Iq) - \omega \times Ld \times Id - E = 0 \quad (2)$$

where V represents the value of voltage applied to the motor, I represents the value of current through a motor winding, and L represents the inductance of a motor winding. Affixes d and q placed on V, I, L indicate values taken in the directions of the generally termed d-axis and q-axis of the motor. The other variables in the equations represent as follows: R is the motor coil resistance; ω is the electrical rotating angular speed of the motor; E is the electromotive force generated by the turning operation of the motor. The electrical angular speed ω of the motor is calculated by multiplying the mechanical angular speed of the motor by the number of pairs of poles. Furthermore, p is a time differential operator. That is, $$p(Ld \times Id) = d(Ld \times Id)/dt$$

The d-axis and the q-axis will be briefly described with reference to FIG. 3. A permanent magnet type three-phase synchronous motor can be expressed by an equivalent circuit shown in FIG. 3. Referring to the equivalent circuit, an axis extending through the turning center of the motor and in the direction of the field generated by a permanent magnet is normally termed d-axis. An axis extending in the plane of rotation of the rotor and intersecting perpendicularly with the d-axis is termed q-axis. The angle formed between the d-axis and a U-phase in the equivalent circuit of FIG. 3 corresponds to the electrical angle θ of the motor.

The voltage equations (1), (2) always hold with respect to the d and q-axes. In the case of sensor-less control of a motor, a motor controller evaluates the equations based on an estimated electrical angle (corresponding to θc in FIG. 3). The result of the evaluation has a calculation error in accordance with an error angle (Δθ in FIG. 3) of the estimated electrical angle θc from a real electrical angle θ. That is, if calculated values of current and voltage are used in the evaluation of the voltage equations (1), (2), the value of the left side of each equation becomes other than zero although the value is supposed to be zero.

An electrical angle at a certain timing is estimated by adding an amount of change in the electrical angle calculated from the motor operating speed to the electrical angle occurring at the previous timing. In this estimation, the error of the electrical angle is caused by two factors. One of the factors is an error in the calculation of an electrical angle that is used as a reference for estimating an electrical angle at that timing, that is, the electrical angle at the previous timing. The other factor is an error in regard to the motor operating speed. The equation (2), which holds with respect to the q-axis, includes a term of electromotive force E created by the turning operation of the motor. Therefore, an error produced in the equation (2) has a close relationship mainly with the error in regard to the motor operating speed. On the other hand, an error produced in the equation (1), which holds with respect to the d-axis, has a relationship mainly with the error in the calculation of the electrical angle. Taking into account the errors in the equations (1), (2) produced when values of current, voltage and the like at a certain timing are used in the calculation of the equations, the electrical angle at the previous timing may be corrected, so that the electrical angle at that timing can be calculated. If the thus-calculated electrical angle is used as a basis for calculating an electrical angle θc at the next timing, it becomes possible to calculate the electrical angle in a sensor-less manner and to control the motor operation.

An example of the method for calculating an electrical angle will be described below. If the time differential (d/dt) in the voltage equations (1), (2) is substituted with a time difference (amount of change/time), the equations can be transformed into equations (3)–(5).

$$\Delta Id = Id(n) - Idm = Id(n) - Id(n-1) - t(Vd - RId + \omega LqIq)/Ld \quad (3)$$

$$\Delta Iq = Iq(n) - Iqm = Iq(n) - Iq(n-1) - t(Vq - RIq + \omega LdId)/Lq \quad (4)$$

$$En = E(n-1) - kk1 \times \Delta Iq \quad (5)$$

In these equations, Id, Iq are currents along of the d and q-axes, that is, the magnetizing current and the torque current, respectively; Ld, Lq are inductances along the d and q-axes; and Vd, Vq are values of voltage applied to the windings. Affixes, such as (n) and the like, are attached to the variables on the basis of the fact that the operations expressed above are periodically repeated. Affix (n) indicates that a value of the variable at a given timing, and (n−1) indicates a value at the timing previous to the given timing. Idm and Iqm represent model values of the magnetizing current and the torque current, that is, theoretical values of current that are calculated on the basis of the voltage equations when it is assumed that the estimated electrical angle is correct. The period of the cycle of this operation is time t in the equations (3), (4).

The terms of time differential in the aforementioned voltage equations is transformed on the assumption that inductance takes a constant value. For example, the transformation is performed as in:

$$p(Ld \times Id) = Ld \times p \times (Id)$$

The other term $p(Lq \times Iq)$ is transformed in the same manner.

The other variables in the above equations represent as follows. That is, ω represents the operating angular speed of the motor in the unit of radian/sec. The motor's operating speed N (rpm) and the number of pairs of poles Np have a relationship expressed as $\omega = 2\pi \times Np \times N/60$. In the equations, kk1 represents a gain that makes a relationship among electromotive forces E(n), E(n−1) and ΔIq and is used to calculate an electrical angle, kk1 being experimentally calculated.

Using the values ΔId, ΔIq, E(n) calculated as described above, an electrical angle θ(n) at the given timing is calculated from the electrical angle θ(n−1) on the basis of the following equation (6):

$$\theta(n) = \theta(n-1) + tE(n)/kk2 + sgn \times kk3 \times \Delta Id \qquad (6)$$

where sgn indicates that the sign of the term is "+" when ω>0, and "−" when ω<0. The equation is based on a precondition that the motor is operating at a high speed. Therefore, the equation does not take into account a case where the motor is not operating, that is, ω=0. Furthermore, kk2, kk3 are experimentally determined gains that are used to calculate an electrical angle, similar to kk1. According to the conventional art, an electrical angle is calculated by repeatedly executing the four equations (3)–(6). The thus-calculated electrical angle θ(n) is applied to the current control at the next timing.

In order to secure a sufficiently high precision when the motor is operating at a high speed, it is necessary to execute the above-described calculation at a high speed. The calculation requires that errors of the currents occurring in the directions of the d and q-axes be determined and, based on the errors, an error of the electrical angle be calculated. Thus, the amount of calculation is very large. In order to execute the calculation while keeping up with the operation of the motor, it is necessary to use a high-cost arithmetic circuit. As a result, the production cost of an apparatus employing a synchronous motor, for example, a hybrid vehicle, becomes high.

A technique normally employed to reduce the required amount of calculation is simplification of the model that is applied to the control. Such a technique corresponds to simplification of the aforementioned voltage equations in the case of a synchronous motor. Technologies for sensor-less control of a synchronous motor have been proposed only recently, and cannot be said to reliably achieve a sufficiently high precision in the electrical angle detection. Therefore, in the case of synchronous motors, a reduction of the control precision through simplification of the mode is not appropriate. On the contrary, the precision needs to be further improved.

Furthermore, in order to detect an electrical angle with a sufficiently high precision in the conventional method, it is necessary to set an appropriate value of each coefficients kk1, kk2, kk3 in the equations (5), (6) separately for each motor. However, the conventional method uses two parameters, that is, ΔId and ΔIq, to detect an electrical angle, so that it is difficult to set a value of each coefficient that will achieve a sufficiently high precision, in accordance with fluctuation of each one of the parameters. Furthermore, since the coefficients kk1, kk2 are closely related to each other as is apparent from the equations (5) and (6), the setting of appropriate values becomes more difficult.

The conventional method has another problem that a change in the temperature of the permanent magnets of the motor occurring during operation causes an error in the electromotive force E and results in a reduction in the precision in electrical angle detection. FIG. 20A indicates over-time changes in the torque actually outputted from the motor when the motor is controlled at a predetermined rotational speed with a required torque being 0 Nm. The hatched area in the diagram of FIG. 20A indicates an output torque detection range. The output torque detection range has a substantially uniform width because the detection range includes ranges of detection errors caused by noises during detection. FIG. 20B indicates changes in the permanent magnet temperature over time during the operation. The hatched area indicates magnet temperatures. As indicated, the magnet temperature increases to about 100° C. as time elapses. Substantially corresponding to the changes in the magnet temperature, errors of about ±5 Nm occur in the motor output torque. Since the magnet temperature inevitably changes during the operation of the motor, how to eliminate the detection errors caused by changes in the magnet temperature is a critical issue.

SUMMARY OF THE INVENTION

The invention is intended to solve the aforementioned problems. It is an object of the invention to improve the precision in electrical angle detection. It is another object of the invention to reduce the time needed for a process of detecting an electrical angle of a salient pole type synchronous motor in a sensor-less manner.

To achieve the objects of the invention, one aspect of the invention provides an electrical angle detecting apparatus that detects an electrical angle that indicates an electrical rotational position of a rotor of a synchronous motor. The electrical angle detecting apparatus includes an electrical angle estimator that estimates an electrical angle of the rotor at a predetermined timing as a model value, a voltage applicator that applies a predetermined voltage to a coil of the synchronous motor on a basis of the estimated electrical angle, a detector that detects a current that flows through the coil in accordance with the voltage applied thereto, as a magnetizing current in a direction along a magnetic flux of the rotor and a torque current in a direction that is electrically perpendicular to the magnetic flux of the rotor, and an electrical angle determination device that determinates a true value of the electrical angle based on an operation expression employing a single parameter that includes at least a deviation between a value of the magnetizing current detected by the detector and a model value of the magnetizing current determined based on a voltage equation that gives a relationship among a voltage across the coil of the synchronous motor, a current through the coil, and an inductance of the coil.

In the conventional art, an electrical angle is determinated by using a plurality of parameters, such as ΔId, ΔIq or the like, as described above. By substituting the equation (5) in the equation (6), an equation can be obtained which provides an electrical angle by using three parameters, that is, ΔId, ΔIq and E(n−1). If E(n−1) in the thus-obtained equation is substituted by the equation (5), an integral term of ΔIq appears. Regardless of what form the equation is transformed into, the conventional art uses a plurality of parameters in the determination of electrical angle.

In contrast, the electrical angle detecting apparatus of the invention determinates an electrical angle by using a single parameter. Therefore, the apparatus makes it relatively easy to set an appropriate value of the gain used in the determination of an electrical angle, so that the precision in the electrical angle determination improves. Furthermore, depending on the parameter setting method employed, the amount of determination needed to determine a parameter necessary for the determination of an electrical angle can be reduced, so that the processing time needed for the electrical angle detection can be reduced.

Reasons why the determination of an electrical angle using a single parameter becomes possible will be explained. The voltage equations are simultaneous equations that give relationships of voltages and currents with respect to the two directions along the d and q-axes as mentioned above. In the aforementioned equations (3)–(6), the determination error with respect to the electromotive force E means substantially the same as the error with respect to the motor rotational speed since the electromotive force E is created by the rotating operation of the motor. The voltage equation with respect to the torque current Iq includes the term of electromotive force, so that an error of the electromotive force E, that is, an error of the rotational speed, can be determined by using the torque current Iq as indicated by the equation (5). On the other hand, the equation with respect to the magnetizing current Id, which does not include a term of electromotive force E, makes it possible to determine a calculation error of the electrical angle as in the conventional art. The rotational speed is a time differentiation of electrical angle. Therefore, through time-differentiation of the error obtained based on the equation with respect to the magnetizing current, a value corresponding to the error regarding the rotational speed can be determined.

From this viewpoint, the present inventors have found that the term of electromotive force E can be expressed by using an error with respect to the magnetizing current Id as a parameter. On the other hand, the electrical angle can also be expressed by using an error with respect to the magnetizing current as a parameter, as is apparent from the equation (6). As a result, the electrical angle can be expressed by using a single parameter that includes at least an error with respect to the magnetizing current. This parameter may also include an error with respect to the torque current Iq since the term of electromotive force E includes an error with respect to the torque current Iq.

This concept was conceived during a process of considering simplification of a model in order to reduce the electrical angle determining operation. Normally, simplification of model is achieved by omitting terms of differentiation of second or greater order or infinitesimal-value terms of higher degrees from an equation that expresses a characteristic of a control object. However, this technique of simplification cannot be applied to the voltage equations concerned with the invention since the voltage equations are relatively simple equations as presented above. If a term is carelessly omitted from one of the voltage equations, the precision in the electrical angle determination will likely deteriorate to a considerable extent.

Under such circumstances, the present inventors reconsidered the physical significance of each of the various values used in the process of determining an electrical angle by using the voltage equations, and found the aforementioned relationship between the error of electromotive force obtained based on the equation of the torque current and the error of electrical angle obtained based on the equation of the magnetizing current. Since the technology for controlling a synchronous motor in a sensor-less manner has been proposed only recently, there has been disclosed no consideration or report on a relationship between the aforementioned two errors with regard to the voltage equation from the aforementioned viewpoint.

The present invention has been accomplished on the basis of the aforementioned idea that the plural parameters conventionally used in the electrical angle determination are unified into a single parameter. As a result, the precision in the electrical angle determination is improved. Furthermore, the use of a relatively simple parameter in the invention reduces the required operations. Therefore, the electrical angle detecting apparatus of the invention is able to detect an electrical angle and thereby control a motor at sufficiently high precision and speed while employing a relatively low-cost arithmetic circuit. Furthermore, if the apparatus employs an arithmetic circuit having substantially the same processing speed as a conventionally employed circuit, the apparatus of the invention is able to perform a control that is more complicated than a control performed by the conventional art. For example, it will become possible to operate a motor in a more highly efficient condition.

Still further, the electrical angle detecting apparatus of the invention can be realized simply by changing the content of the electrical angle determination. Therefore, it is possible to improve the precision and the processing speed in the electrical angle determination without changing the conventional hardware construction.

The electrical angle detecting apparatus of the invention determines an electrical angle by using a single parameter. Therefore, the arithmetic circuit for executing the electrical angle determination can be relatively easily formed. If the electrical angle-determining circuit is realized by a hardware construction in this manner, it becomes possible to achieve a very high-speed processing.

In the electrical angle detecting apparatus of the invention, the electrical angle determining device can handle various arithmetic expressions. For example, based on the above-described relationship, an error with respect to electromotive force E can be determined through the time-differentiation of the error ΔId determined with respect to the magnetizing current. Therefore, the electrical angle is basically proportional to the aforementioned parameter.

From this viewpoint, the electrical angle detection device may also use a proportional term of multiplication of the magnetizing current by a coefficient as a basis for the determination of electromotive force.

Furthermore, the electrical angle determination device may also use a proportional term in which the parameter is multiplied by a first coefficient and an integral term in which the parameter is multiplied by a second coefficient to determine the true value of the electrical angle.

As in a generally termed proportional-plus-integral control, the provision of an integral term restrains a constant shift of a result of the electrical angle determination caused by accumulation of errors over time. As a result, the precision in the electrical angle determination can be improved, and stable operation of a motor for a long time becomes possible. The arithmetic expressions indicated herein is not restrictive, but various other arithmetic expressions may also be used.

In the electrical angle detecting apparatus of the invention, the parameter may also be a deviation of the magnetizing current. As a result, it becomes possible to omit the execution of the equation with respect to the torque current during the determination of an electrical angle. Therefore, the time needed for the processing can be further reduced.

The electrical angle detecting apparatus of the invention also allows an improvement of the precision in the electrical angle determination for the following reasons. In the control of a synchronous motor, the value of torque current contributing to torque output is greater than the value of magnetizing current. Therefore, an error occurring in the torque current tends to be relatively large, and the fluctuation of the error has a significant effect on the determination error of electrical angle. However, since the electrical angle detecting apparatus is able to detect an electrical angle by using only the magnetizing current, the electrical angle detecting apparatus is able to reduce the effect caused by fluctuations and errors as mentioned above. Therefore, through the setting of a gain used in the determination, the electrical angle detecting apparatus is able to improve the precision in the electrical angle determination.

If a deviation of the magnetizing current is used as a parameter, the electrical angle determination device may determine an electrical angle θ by using equations (7)–(10):

$$\theta=\theta(n-1)+k1\times\Delta Id+\Sigma(\Delta Id) \qquad (7)$$

where:

$$\Delta Id=Id(n)-Idm \qquad (8);$$

$$Idm=Id(n-1)+t(Vd-R\times Id(n-1)+\omega\times Lq\times Iq(n-1))/Ld \qquad (9);$$

$$\omega=(k1\times\Delta Id+k2\times\Sigma(\Delta Id))/t \qquad (10);$$

Id(n) is a value of the magnetizing current at a given timing;

θ(n−1) is a value of the electrical angle at a timing previous to the given timing;

Idm is a model value of the magnetizing current;

Id(n−1) is a value of the magnetizing current at the timing previous to the given timing;

Iq(n−1) is a value of the torque current at the previous timing;

Ld is an inductance in a direction of the magnetizing current;

Lq is an inductance in a direction of the torque current;

R is a value of resistance of the coil;

Vd is a value of voltage in the direction of the magnetizing current;

t is a calculation executing period; and k1, k2 are coefficients.

Having this feature, the electrical angle detecting apparatus is able to determine an electrical angle by using the equations (7)–(10) instead of the equations (3)–(6) mentioned above. Therefore, it becomes possible to improve the precision and the processing speed in the electrical angle determination.

In the electrical angle detecting apparatus of the invention, the parameter may also be a polynomial including a deviation of the magnetizing current and a deviation of the torque current. As a result, the detection of an electrical angle can be stably performed even if the error between the model value and the true value of electrical angle is large. Therefore, the stability of the motor control improves.

FIG. 11 is a graph indicating a relationship between the error of electrical angle and the deviation ΔId of magnetizing current, in which results of an experiment on a motor are indicated. As indicated in FIG. 10, as the error of electrical angle increases from zero in the positive direction, the deviation ΔId of magnetizing current gradually increases, and reaches a substantially fixed value in a region where the error is at least 30 degrees. For example, if an electrical angle is detected by using only the deviation ΔId of magnetizing current as a parameter, an error of electrical angle equal to or greater than 30 degrees makes it impossible to specify an amount of error and makes it impossible to detect an electrical angle with good precision.

FIG. 12 is a graph indicating a relationship between the error of electrical angle and the deviation ΔIq of torque current. As indicated, the deviation ΔIq of torque current exhibits a monotonously increasing tendency even if the error of electrical angle increases in the positive direction. Therefore, if a polynomial including the deviation ΔId of magnetizing current and the deviation ΔIq of torque current is employed as a parameter for the use in the electrical angle detection, a monotonously increasing tendency is exhibited based on the characteristic of ΔIq even in a region where the error angle is great, so that an electrical angle can be determined with good precision. Although FIGS. 11 and 12 indicate results of an experiment on a specific motor, the tendency indicated by the graphs normally occurs in synchronous motors.

If a polynomial including the deviation ΔId of magnetizing current and a deviation ΔIq of torque current is used as a parameter, the electrical angle determination device may also determine an electrical angle θ by using the following equations (11)–(17):

$$\theta=\theta(n-1)+k1\times PM+\Sigma PM \qquad (11)$$

where:

$$PM=\Delta Id+\Delta Iq \qquad (12);$$

$$\Delta Id=Id(n)-Idm \qquad (13);$$

$$Idm=Id(n-1)+t(Vd-R\times Id(n-1)+\omega\times Lq\times Iq(n-1))/Ld \qquad (14);$$

$$\Delta Iq=Iq(n)-Iqm \qquad (15);$$

$$Iqm=Iq(n-1)+t(Vq-R\times Iq(n-1)+\omega\times Ld\times Id(n-1)-E(n-1))/Lq \qquad (16);$$

$$\omega=(k1\times PM+k2\times\Sigma PM)/t \qquad (17);$$

Id(n) is a value of the magnetizing current at a given timing;

θ(n−1) is a value of the electrical angle at a timing previous to the given timing;

Idm is a model value of the magnetizing current;

Id(n−1) is a value of the magnetizing current at the timing previous to the given timing;

Iq(n) is a value of the torque current at the given timing;

Iqm is a model value of the torque current;

Iq(n−1) is a value of the torque current at the timing previous to the given timing;

Ld is an inductance in a direction of the magnetizing current;

Lq is an inductance in a direction of the torque current;

R is a value of resistance of the coil;

E is an electromotive force created in the coil;

Vd is a value of voltage in the direction of the magnetizing current;

Vq is a value of voltage in the direction of the torque current;

t is a calculation executing period; and k1, k2 are coefficients.

FIG. 13 is a graph indicating a relationship between the parameter $\Delta Id+\Delta Iq$ and the error of electrical angle. This parameter exhibits a monotonously increasing tendency even if the error angle of electrical angle is large, as mentioned above. Therefore, it becomes possible to detect an electrical angle with good precision even in a region where the error angle is large. Therefore, even in such a region, a synchronous motor can be stably controlled.

If the deviation $\Delta Iq$ of torque current is taken into account for detection of an electrical angle in a permanent magnet type synchronous motor having at least one permanent magnet, the aforementioned electrical angle determination device may determine the electrical angle by calculating a deviation of the torque current while avoiding using a term of an electromotive force produced by the at least one permanent magnet of the synchronous motor during operation of the synchronous motor, in calculation of the deviation of the torque current.

In the permanent magnet type synchronous motor, the permanent magnet temperature changes during operation and affects the magnitude of the electromotive force E, as explained above. If the term of electromotive force is ignored, it becomes possible to determine an electrical angle while avoiding such an effect of a change in the permanent magnet temperature. In this case, the ignoring of the term of electromotive force included in the original expression based on the voltage equations may possibly produce a calculation error. However, since the electromotive force is a physical quantity closely related to the deviation $\Delta Id$ of magnetic current and the deviation $\Delta Id$ of torque current, the calculation error can be reduced or substantially avoided by appropriately adjusting the gain in the electrical angle-calculating expression using as a parameter a multi-term expression including the variables $\Delta Id$ and $\Delta Iq$. As a result, the aforementioned aspect of the invention makes it possible to avoid the effect of a change in the permanent magnet temperature in a permanent magnet type synchronous motor and to detect an electrical angle with a high precision.

To further improve the electrical angle detection angle by reducing or substantially avoiding the effect of a change in the permanent magnet temperature, the electrical angle detecting apparatus may have a construction wherein the synchronous motor is a permanent magnet type synchronous motor having at least one permanent magnet, and wherein the electrical angle apparatus further comprises an electromotive force storage device that stores, beforehand, a fluctuation of the electromotive force produced by the at least one permanent magnet during operation of the synchronous motor, the fluctuation being caused depending on a temperature of the at least one permanent magnet, and a temperature detector that detects the temperature of the at least one permanent magnet; and wherein the electrical angle determination device determines the electrical angle by compensating for the fluctuation of the electromotive force based on the temperature detected by the temperature detector, by referring to the electromotive force storage device.

This construction improves the electrical angle detection angle by reducing or substantially avoiding the effect of a change in the permanent magnet temperature although the construction increases the amount of calculation required to compensate for the fluctuation of the electromotive force. It is also possible to adopt a construction in which the aforementioned compensation is performed only when the permanent magnet temperature is within a predetermined range in which the effect of the permanent magnet temperature on the electromotive force is great. This construction makes it possible to simplify the calculation if the effect of the permanent magnet temperature on the electromotive force is small, thereby advantageously increasing the processing speed.

The permanent magnet temperature may be detected by using a sensor such as a thermister, a thermocouple device, or the like. If the permanent magnets are provided in the rotor of the synchronous motor, the output from such a sensor can be detected by using a mechanism including a slip ring and a brush, or a telemeter, or the like. The aforementioned temperature detector may also employ a detection method other than the method in which the permanent magnet temperature is directed detected. For example, the temperature detector may estimate a permanent magnet temperature by continually monitoring the operating condition of the synchronous motor.

The aforementioned electromotive force storage device stores a relationship regarding the aforementioned fluctuation that is specified through experiments or analysis. Such a relationship may be stored in the form of a table, a function, or the like. Various parameters may be selected and stored. It is also possible to store a value of the electromotive force, or a deviation from a predetermined electromotive force, or the like.

In accordance with another aspect of the invention, an electrical angle detecting method is provided.

The electrical angle detecting method of the invention is a method for detecting an electrical angle that indicates an electrical rotational position of a rotor of a synchronous motor, the method including the steps of estimating an electrical angle of the rotor at a predetermined timing as a model value, applying a predetermined voltage to a coil of the synchronous motor on a basis of the estimated electrical angle, detecting a current that flows through the coil in accordance with the voltage applied thereto, as a magnetizing current in a direction along a magnetic flux of the rotor and a torque current in a direction that is electrically perpendicular to the magnetic flux of the rotor and determining a true value of the electrical angle based on an operation expression employing a single parameter that includes at least a deviation between a value of the magnetizing current detected by the detector and a model value of the magnetizing current determined based on a voltage equation that gives a relationship among a voltage across the coil of the synchronous motor, a current through the coil, and an inductance of the coil.

This electrical angle detecting method makes it possible to detect an electrical angle with good precision and at high speed for substantially the same reasons as stated above in conjunction with the electrical angle detecting apparatus. It should be apparent that substantially the same additional elements as described above in conjunction with the electrical angle detecting apparatus can also be employed in the electrical angle detecting method.

In accordance with still another aspect of the invention, a motor control apparatus as described above is provided.

The motor control apparatus of the invention is an apparatus that detects an electrical angle indicating an electrical rotational position of a rotor of a synchronous motor and, based on the electrical angle, controls the synchronous motor so that the motor operates at a required rotational speed and a required torque, the apparatus including an electrical angle estimator that estimates an electrical angle of the rotor at a predetermined timing as a model value, a current controller that achieves a magnetizing current flowing through a coil of the synchronous motor in a direction along a magnetic flux of the rotor and a torque current flowing through the coil in a direction that is electrically perpendicular to the magnetic flux of the rotor, by applying a voltage to the coil of the synchronous motor in accordance with the required torque on a basis of the estimated electrical angle, a detector that the magnetizing current and the torque current, an electrical angle determination device that determines a true value of the electrical angle based on an operation expression employing a single parameter that includes at least a deviation between a value of the magnetizing current detected by the detector and a model value of the magnetizing current determined based on a voltage equation that gives a relationship among a voltage across the coil of the synchronous motor, a current through the coil, and an inductance of the coil, and a reflector that reflects the true value of the electrical angle determined by the electrical angle determination device in estimation of an electrical angle at a next timing.

This motor control apparatus is able to detect an electrical angle with good precision and at high speed for substantially the same reasons as stated above in conjunction with the electrical angle detecting apparatus. Since the apparatus controls current to be supplied through the coil by using the detected electrical angle, the apparatus is able to appropriately supply a current in accordance with a required torque and rotational speed. Therefore, the motor control apparatus of the invention is able to reduce the fluctuation of torque and rotational speed and favorably control the operation of a synchronous motor.

It should be apparent that the motor control apparatus of the invention may also employ the various additional elements described above in conjunction with the electrical angle detecting apparatus. The motor control apparatus of the invention may further employ additional elements as described below.

The motor control apparatus of the invention may further include a compensator that compensates for an effect caused on the parameter by magnetic saturation that occurs in the coil.

The equations (3)–(6) and the like are set on the precondition that the inductances Ld, Lq of the motor do not change over time. The inductance has a close relationship with a magnetic flux produced by current flowing through a coil. If a large current flows through the coil, a phenomenon generally termed magnetic saturation occurs and, therefore, the inductance reduces, as well known. If the required motor torque becomes large, the torque current increases and magnetic saturation occurs. The thus-caused change in the value of inductance affects the results of evaluation of the voltage equations. The motor control apparatus is able to compensate for the effect caused by magnetic saturation by using the compensator. Therefore, even if the required torque is so large that magnetic saturation occurs, the apparatus is able to appropriately control the motor.

It is possible to provide the compensator in various forms. For example, the compensator may have a storage in which a fluctuation that is caused on the parameter in accordance with the required torque is pre-stored, and a corrector that adjusts the parameter with reference to the storage.

This compensator is able to relatively easily compensate for the effect of magnetic saturation. Fluctuation caused on the magnetizing current in accordance with the required torque can be pre-set based on analysis, experiments and the like. As another manner of the compensation, it is also possible to vary the inductance in accordance with the required torque in a region in which magnetic saturation occurs, since the aforementioned effect is caused by a change in the inductance resulting from magnetic saturation.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein:

FIG. 4 is a flowchart illustrating a motor control routine;

FIG. 5 is a flowchart illustrating an electrical angle detecting routine according to a first embodiment of the invention;

DETAILED DESCRIPTION OF PREFERRED EMBODIMENTS

Preferred embodiments of the invention will be described in the following order:

A. CONSTRUCTION OF APPARATUS
B. MOTOR CONTROL
C. SECOND EMBODIMENT
D. THIRD EMBODIMENT
E. FOURTH EMBODIMENT
F. APPLICATION OF MOTOR CONTROL APPARATUS

A. Construction of Apparatus

Figure 1:
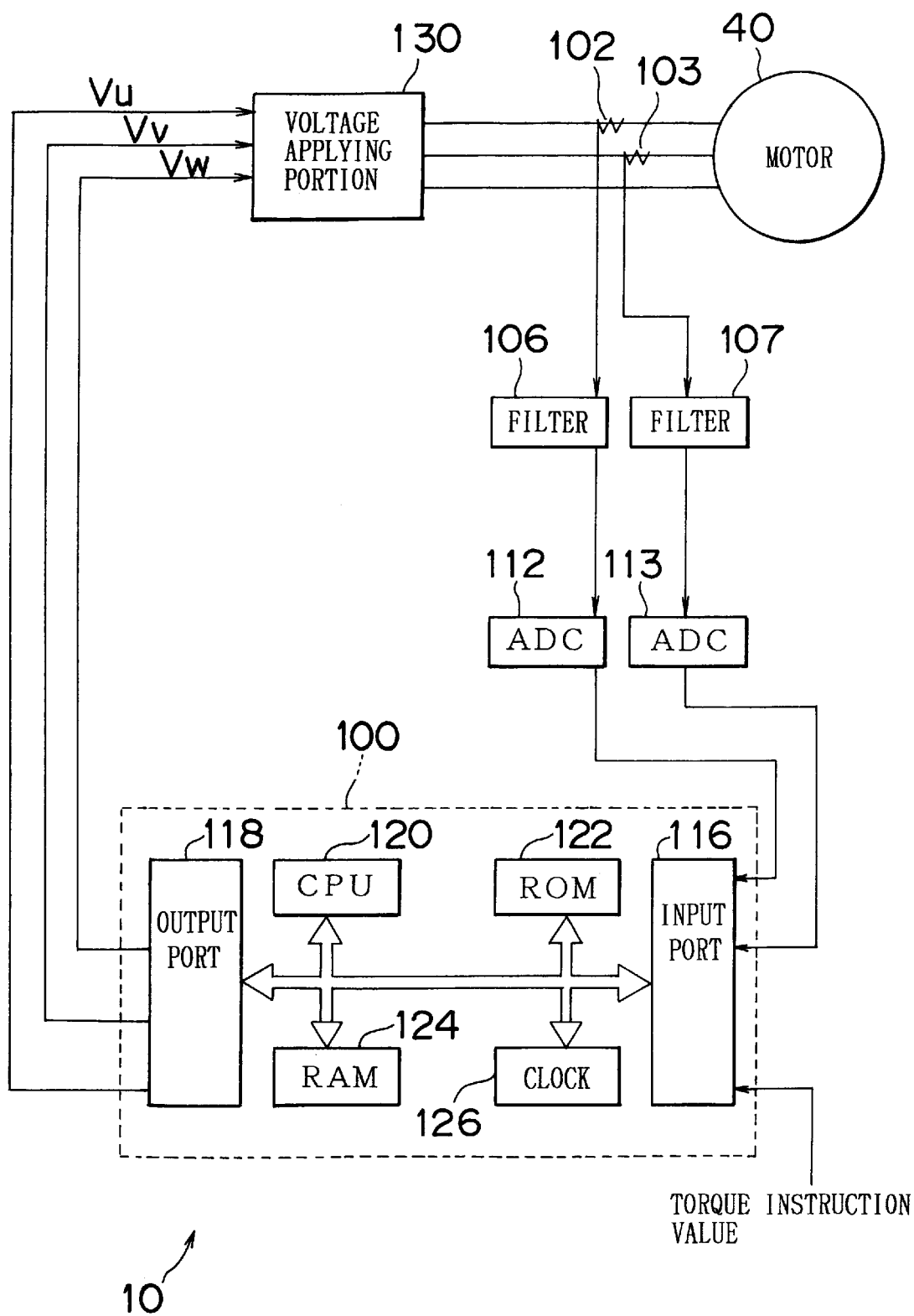
FIG. 1 is a schematic block diagram of the construction of a motor control apparatus 10.
Figure 2:
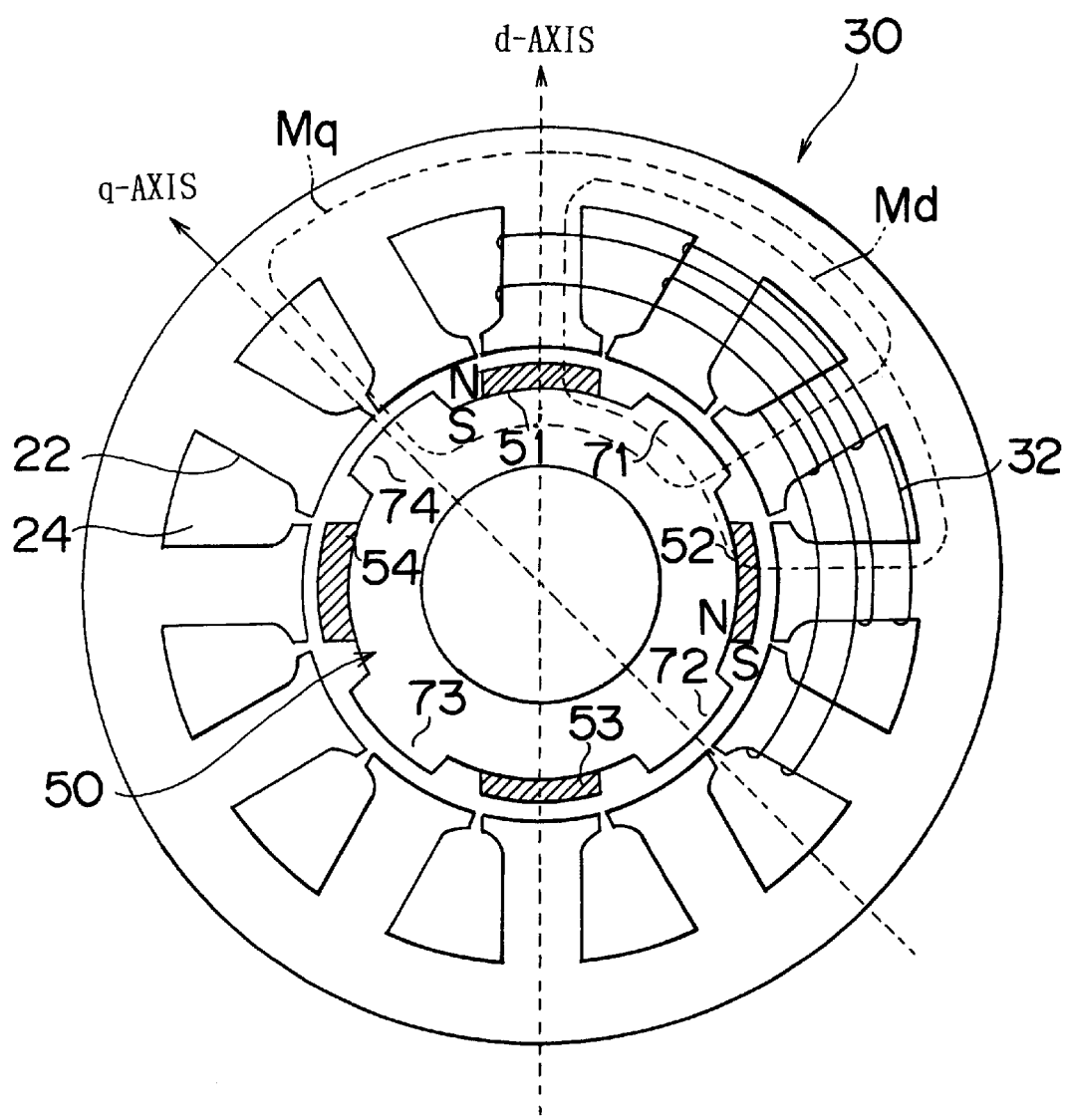
FIG. 2 is a schematic illustration of the construction of a three-phase synchronous motor 40 shown in FIG. 1.

FIG. 1 is a schematic illustration of the construction of a motor control apparatus 10 according to an embodiment of the invention. FIG. 2 is a schematic illustration of the construction of a three-phase synchronous motor 40 that is an object of control.

The construction of the three-phase synchronous motor 40 will first be described with reference to FIG. 2. The three-phase synchronous motor 40 is formed by a stator 30 and a rotor 50. The rotor 50 has four salient poles 71–74 at right angle-spaced positions. Permanent magnets 51–54 are fixed at positioned between the salient poles 71–74. The permanent magnets 51–54 are magnetized in the directions of radii of the rotor 50 in such a manner that adjacent magnets have opposite polarities. For example, an outer peripheral side of the permanent magnet 51 is the N pole, and an outer peripheral side of the permanent magnet 52 is the S pole. The permanent magnets 51 and 52 form a magnetic path Md extending through the rotor 50 and the stator 30. Although the embodiment employs a non-sine wave-magnetized motor in which the distribution of magnetic fluxes caused by the permanent magnets 51–54 does not take the form of a sine wave, it is also possible to employ a sine-wave magnetized motor.

The stator 30 has twelve teeth 22. Slots 24 defined between the teeth 22 accommodate coils 32 for generating rotating fields in the stator 30. If an exciting current is caused to flow so as to generate rotating fields in the coils 32, a magnetic path Mq is formed, extending through adjacent salient poles, the rotor 50 and the stator 30.

An axis along which magnetic fluxes formed by the permanent magnet 51 extend through the center of rotation and the rotor 50 in the direction of a radius of the rotor 50 is termed d-axis. An axis that extends in the plane of rotation of the rotor 50 and that is electrically perpendicular to the d-axis is termed q-axis. The d-axis and the q-axis turn together with rotation of the rotor 50. In the embodiment, the outer peripheral face of each of the permanent magnets 51, 53 is the N pole, and the outer peripheral face of each of the permanent magnets 52, 54 is the S pole. Therefore, the q-axis forms a geometric angle of 45° with respect to the d-axis as shown in FIG. 2.

Figure 3:
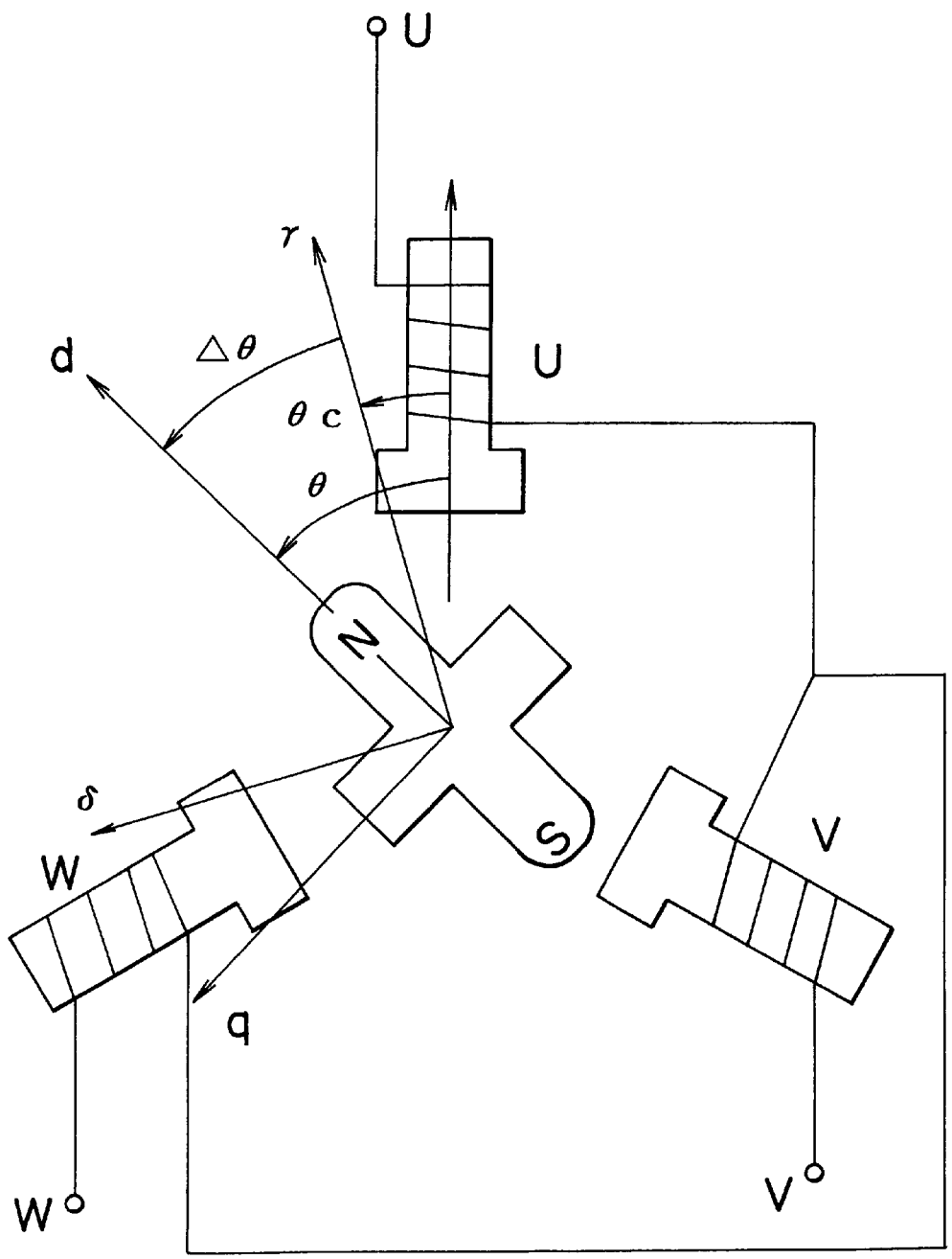
FIG. 3 is a diagram of an equivalent circuit of the three-phase synchronous motor.

FIG. 3 shows an equivalent circuit diagram of the three-phase synchronous motor 40 of this embodiment. As shown in FIG. 3, the three-phase synchronous motor 40 is expressed by an equivalent circuit that has two-phase coils U, V, W and has a permanent magnet rotatable about the axis of rotation. In the equivalent circuit, the d-axis is expressed as an axis extending through the permanent magnet, with the direction from the center of rotation toward the N-pole side being defined as a positive direction. The electrical angle is defined as a rotational angle θ formed between an axis extending through the U-phase coil and the d-axis.

The construction of the motor control apparatus 10 will now be described with reference to FIG. 1. The motor control apparatus 10 is substantially made up of a motor-controlling ECU 100 that receives a torque instruction inputted from an external device and controls the motor currents of three phases (U, V and W-phases) of the three-phase synchronous motor 40, current sensors 102, 103 that detect the U-phase current Iu and the V-phase current Iv of the three-phase synchronous motor 40, filters 106, 107 that remove high-frequency noises from the detected currents, and two analog-to-digital converters (ADC) 112, 113 that convert the detected values of current into digital data. The total of the U, V and W-phase currents is always maintained at 0, so that the W-phase current does not need to be detected, but can be determined from the values of the U and V-phase currents. This embodiment does not employ a sensor for detecting an electrical angle of the three-phase synchronous motor 40. That is, the embodiment detects the electrical angle in a sensor-less manner.

Provided in the motor-controlling ECU 100 are a CPU 120 for executing arithmetic logic operations, a ROM 122 storing the operations to be executed by the CPU 120 and data necessary for the operations, a RAM 124 for temporarily storing data necessary for an operation, a clock 126 for measuring time, and the like, as shown in FIG. 1. These components of the motor-controlling ECU 100 are interconnected by a bus. The bus is also connected to an input port 116 and an output port 118. Via the input port 116, the CPU 120 is able to read the currents Iu, Iv flowing through the U and V-phase coils of the three-phase synchronous motor 40. It is also possible to input a torque instruction into the motor-controlling ECU 100.

The output portion of the motor-controlling ECU 100 is connected to a voltage applying portion 130 that applies a voltage across each coil of the motor so as to achieve determined currents Iu, Iv, Iw of the three phases of the motor. The CPU 120 controls the voltage applied to each coil of the three-phase synchronous motor 40 by outputting control outputs Vu, Vv, Vw to the voltage applying portion 130. The voltage applying portion 130 is formed by a transistor-inverter. The transistor-inverter has a circuit construction in which, separately for each of the U, V and W-phases, a pair of transistors on the source side and the sink side of a main power source are connected. When the individual transistors of the transistor-inverter are switched on and off in accordance with the control outputs Vu, Vv, Vw through generally termed PWM control, AC currents of a pseudo-sine wave flow through the coils 32 of the three-phase synchronous motor 40, thereby forming rotating magnetic fields. The rotor 50 is rotated by interaction between the rotating magnetic fields and the magnetic fields generated by the permanent magnets 51 of the rotor 50 and the like.

B. Motor Control

The motor control process performed by the motor control apparatus 10 of this embodiment will now be described. This embodiment employs vector control in which current is handled as a vector. The vector control will be described briefly prior to the specific operations of the control.

The concept of the vector control will be described with reference to FIG. 3. If the current Iu is caused to flow through the U-phase coil in FIG. 3, the U-phase coil generates a magnetic field. The magnetic field extends through the U-phase coil, and the magnitude of the field varies with the current Iu. Therefore, the U-phase current can be expressed as a vector quantity having a magnitude of Iu and a direction of the magnetic field. Similarly, the currents Iv, Iw through the V and W-phase coils can also be expressed as vector quantities. If current is considered as a vector in this manner, any current vector in a plane can be expressed as a sum of current vectors in representative two directions. If the two directions are defined along the d and q-axes shown in FIG. 3, it becomes possible to express a current vector corresponding to a magnetic field generated in an arbitrary direction in the plane of rotation of the motor by using the currents Id, Iq in the two directions.

Relational expressions for determining currents Id, Iq based on the U and V-phase currents Iu, Iv are given as:

$$Id=(-Iu\times\sin(\theta-120)+Iv\times\sin\theta)\times\sqrt{2}$$

$$Iq=(-Iu\times\cos(\theta-120)+Iv\times\cos\theta)\times\sqrt{2}$$

The relation indicated by the equations is termed as three-phase/two-phase conversion.

Conversely, if Id, Iq are already determined, the current of each phase Iu, Iv, Iw can be determined on the basis of the following expressions and the condition that the total of the Y, V and W-phase currents is zero, that is, Iu+Iv+Iw=0.

$$Iu=(Id\times\cos\theta-Iq\times\sin\theta)\times\sqrt{(2/3)}$$

$$Iv=(Id\times\cos(\theta-120)-Iq\times\sin(\theta-120))\times\sqrt{(2/3)}$$

$$Iw=-Iu-Iv$$

This conversion is termed as two-phase/three-phase conversion.

Therefore, if currents that need to flow in the directions of the d-axis and the q-axis of the motor are determined, currents to be actually supplied to the U, V and W-phase coils can be determined on the basis of the above equations. It is also possible to determine voltages to be supplied to the U, V and W-phase coils. Based on this concept, the embodiment performs the motor current control. In the description hereinafter, a term "d-axis and q-axis currents", as for example, indicates the magnitude of a current vector based on the aforementioned concept.

FIG. 4 is a flowchart illustrating a motor control routine according to this embodiment. This routine is periodically executed by the CPU 120 of the motor-controlling ECU 100 shown in FIG. 1, together with other control routines. In the motor control routine, the CPU 120 detects an electrical angle through an electrical angle detecting process in step S100 and, based on the detected electrical angle, executes a current control process in step S200. The current control process is performed to supply current through the coils 32 wound on the stator 30 in order to generate torque.

FIG. 5 shows a flowchart illustrating the electrical angle detecting routine. At a time point at which this routine is started, the CPU 120 has set a model value θc (see FIG. 3) as an estimated electrical angle based on the control operations that the CPU 120 has performed up to that time point. Current in accordance with a required torque has come to flow through the coils 32 due to the control operations performed up to the time point. In the electrical angle detecting routine, the CPU 120 determines a detected electrical angle through the following processing.

When the electrical angle detecting routine is started, the CPU 120 detects a current Id along the d-axis and a current Iq along the q-axis in step S110. The currents are determined through the two-phase/three-phase conversion based on the U and V-phase currents detected by the current sensors 102,103 shown in FIG. 1. The coordinate conversion is performed by using the electrical angle model value θc.

Subsequently in step S120, the CPU 120 determines ΔId from the detected current values Id, Iq on the basis of the following equations (17) and (18):

$$\Delta Id = Id(n) - Idm \tag{17}$$

$$Idm = Id(n-1) + t(Vd - R \times Id(n-1) + \omega \times Lq \times Iq(n-1))/Ld \tag{18}$$

Affixes (n) and (n−1) are attached to variables, based on the fact that the electrical angle detecting routine is periodically executed. Affix (n) indicates a value of each variable detected in step S110 in the present cycle of the routine. Affix (n−1) indicates a value of the variable detected in the previous cycle of the electrical angle detecting routine. Furthermore, t represents the execution period of the electrical angle detecting routine. Idm represents a model value of the magnetizing current. More specifically, Idm represents a value determined by adding to the previous current value Id(n−1) an amount of change of the current provided by determining the voltage equation on the assumption that the electrical angle is correct, that is, a theoretical value of the magnetizing current at the present moment.

Furthermore, in the above equations, Vd is a value of voltage in the direction of the d-axis; ω is the motor operating angular speed; and Ld, Lq are inductances in the directions of the d-axis and the q-axis, that is, coefficients determined for individual motors. The motor operating angular speed ω is in the unit of radian/second, so that the motor operating angular speed ω and the motor operating speed N (rpm) have a relationship of ω=2π×N/60.

Subsequently in step S130, the CPU 120 adjusts ΔId. In this embodiment, a relationship between the required torque and the amount of correction is pre-stored as a table in the ROM 122. The CPU 120 determines an amount of correction of ΔId corresponding to the required torque, by referring to the table. The CPU 120 then adjusts ΔId by reflecting the amount of correction.

Figure 6:
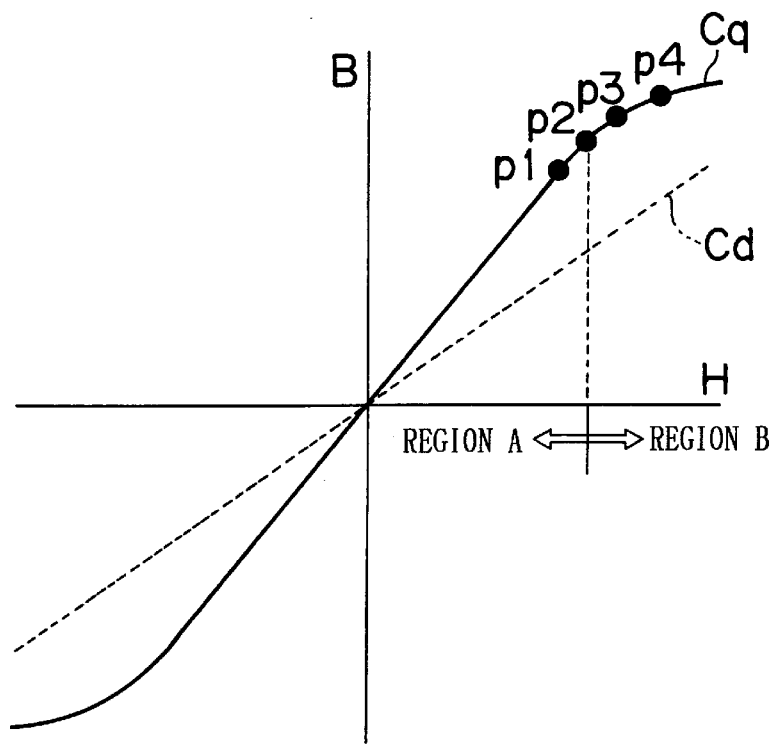
FIG. 6 is a graph indicating a relationship between the magnetic field H and the magnetic flux density B.

The reasons why correction of ΔId is needed and the setting of a table that determines the amount of correction will be described. FIG. 6 is a graph indicating a relationship between the external magnetic field H including fields generated by current and the magnetic flux density B. In the graph, the gradients of tangents to a curve Cq corresponding to the q-axis and a curve Cd corresponding to the d-axis correspond to the inductances Lq, Ld, respectively. A situation in which the required torque is relatively small corresponds to a region A in which the flux density is relatively low. Since the curves in this region are relatively linear, the gradients of tangents to each curve, that is, the inductance Lq, Ld, become substantially fixed at a constant value. As the required torque increases, the curves enter a region B in which the curve Cq exhibits non-linearity. In this region, the inductance changes. Since in the equations (17), (18), ΔId is determined by using inductances Lq, Ld, an inductance change produces an error in the result of the determination.

Figure 7:
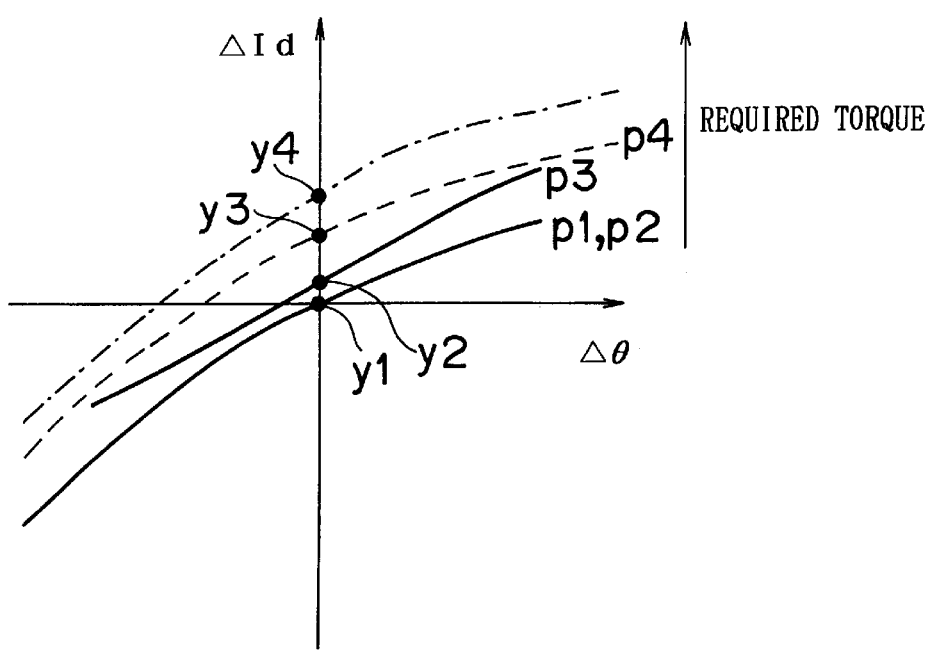
FIG. 7 is a graph indicating a relationship between the electrical angle error $\Delta\theta$ and the d-axis current error $\Delta Id$.
Figure 17:
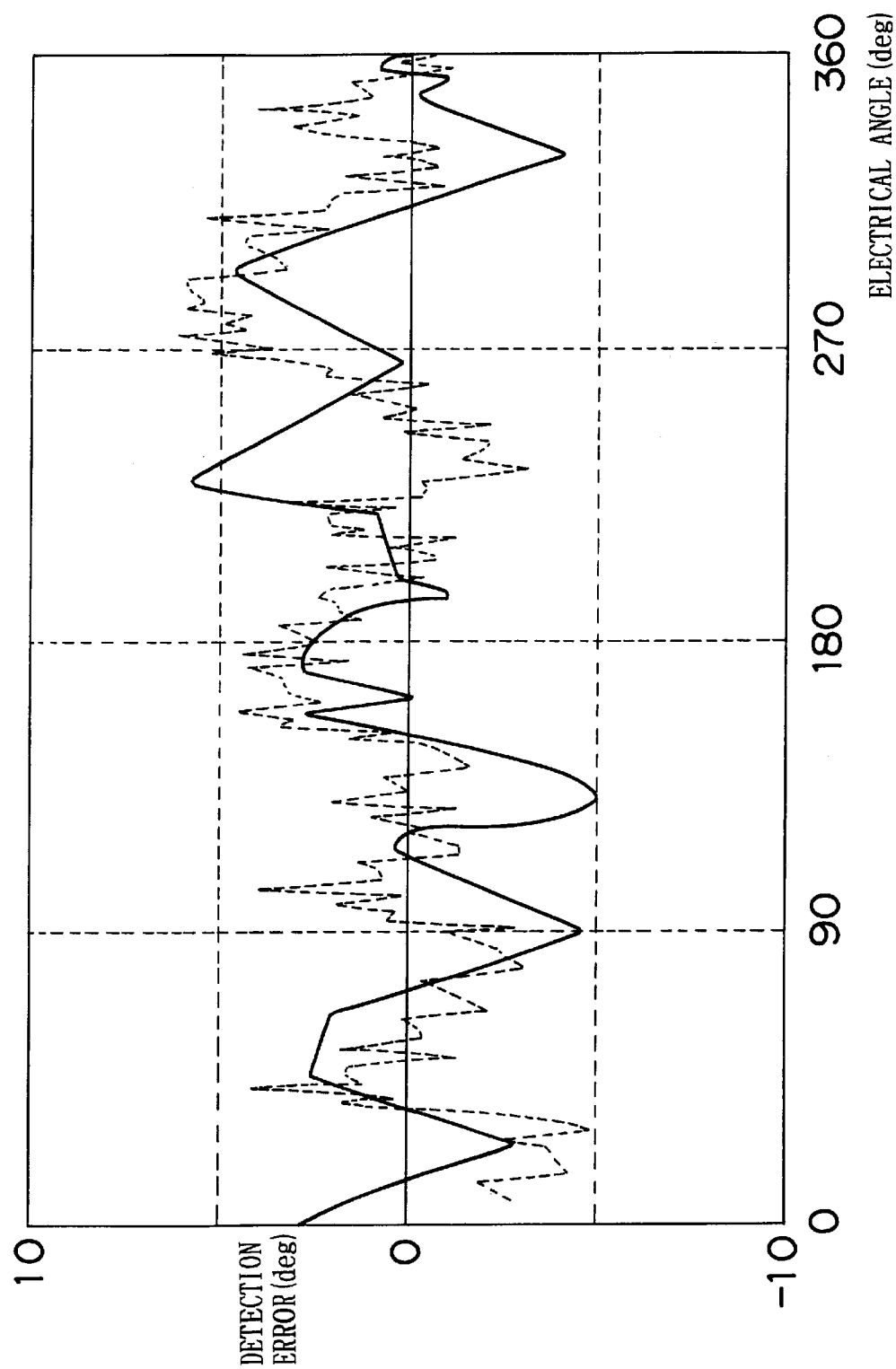
FIG. 17 is a graph indicating errors in the detection of electrical angle in the second and third embodiments.

FIG. 7 illustrates the behavior of the error mentioned above. In the graph of FIG. 17, the horizontal axis indicates the determination error Δθ of the electrical angle described below, and the vertical axis indicates ΔId, whereby a correlation therebetween is indicated. If the inductance is within a linear region (region A in FIG. 6), curves pass through the origin point as in a curve corresponding to p1, p2 in FIG. 7. In contrast, if the inductance is within a non-linear region (region B in FIG. 6), the intercept of a curve at Δθ=0 shifts in accordance with the value of inductance, which is determined in accordance with the required torque as indicated in FIG. 6. In this embodiment, amounts of shift of the ΔId intercepts y1, y2 and the like in accordance with the required torque are determined beforehand, and pre-stored as a table in the ROM 122.

In step S130 in FIG. 5, the CPU 120 adjusts ΔId so that the curve of ΔId passes through the origin point, by subtracting the amount of correction determined on the basis of the table as shown in FIG. 7 from the determined ΔId. The reason why this correction is performed will be described later.

After adjusting ΔId by using the table in step S130 in FIG. 5, the CPU 120 determines an electrical angle θ(n) at the given time from the previous result of electrical angle detection θ(n−1) by using equation (19) in step S140. Subsequently in step S150, the CPU 120 determines ω based on equation (20). The determined electrical angle θ(n) and the determined angular speed ω are used in the control process at the next timing.

$$\theta = \theta(n-1) + k1 \times \Delta Id + k2 \times \Sigma(\Delta Id) \quad (19)$$

$$\omega = (k1 \times \Delta Id + k2 \times \Sigma(\Delta Id))/t \quad (20)$$

where k1, k2 are experimentally determined gains.

Based on the thus-determined electrical angle θ, the CPU 120 executes the current control. The current control is performed based on generally termed proportional plus integral control. That is, the CPU 120 sets target values of the d-axis current and the q-axis current based on the required torque, and determines deviations of the target values from the d-axis current and the q-axis current occurring at the given timing. The CPU 120 then multiplies the deviations and the integrals thereof by predetermined gains to set amounts of change of voltage. Since the proportional plus integral control is a well-known technology, detailed description of the proportional plus integral control is omitted.

The voltage control is actually performed based on the on and off-durations of each transistor forming the transistor inverter of the voltage applying portion 130. Therefore, the CPU 120 performs the PWM control of the on-duration of each transistor so as to realize the voltage instruction value set by the above-described process. The CPU 120 outputs signals Vu, Vv, Vw in accordance with the on-duration and the timing of each transistor, to the voltage applying portion 130 via the output port 118 shown in FIG. 1.

The motor control apparatus described above is able to reduce the time needed for the synchronous motor processings. The conventional sensor-less control determines an electrical angle by working out the four equations (3)–(6), and accordingly controls a motor. In order to perform this control, the conventional control needs about 500 steps of operations. In contrast, the motor control apparatus of this embodiment is able to control the motor based on the aforementioned equations (17)–(20). The amount of operations needed for this control is about 300 steps. Therefore, by reducing the amount of operations, the motor control apparatus of the embodiment is able to reduce the processing time. Hence, it becomes possible to control a motor with a sufficiently high precision even if the processing speed of the CPU 120 used is relatively slow. As a result, the embodiment reduces the production cost of an apparatus employing a synchronous motor.

Figure 8:
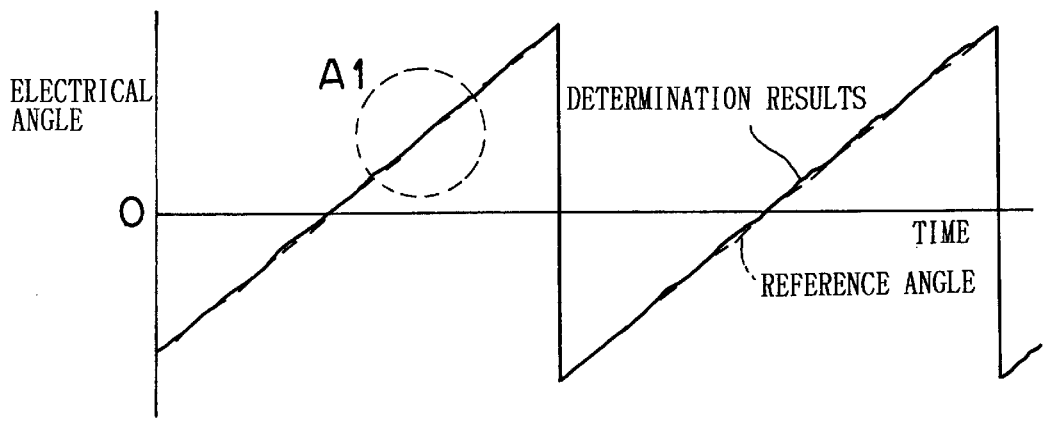
FIG. 8 is a graph indicating results of the electrical angle detection according to the embodiment.
Figure 9:
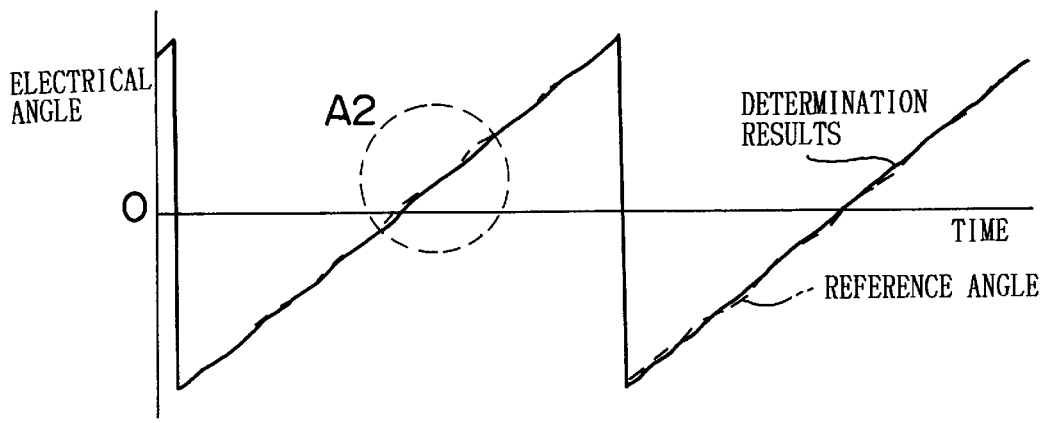
FIG. 9 is a graph indicating results of the electrical angle detection according to the conventional art.

The motor control apparatus of the embodiment is able to reduce the processing time and also achieve a higher precision in determining an electrical angle than the conventional art. FIGS. 8 and 9 are graphs indicating results of the electrical angle determination. The solid line in FIG. 8 indicates results of the electrical angle determination according to the embodiment. The broken line indicates the electrical angle detected by a sensor. As indicated, the results of the electrical angle determination and the detected electrical angle well coincide. The graph of FIG. 9 indicates results of the electrical angle determination obtained through a control using the equations (3)–(6) mentioned above as a comparative example. As is apparent from the comparison between a region A1 in FIG. 8 and a region A2 in FIG. 9, the embodiment improves the electrical angle detecting precision over the conventional art.

Two reasons for the precision improvement can be considered. One reason is that because the embodiment determines an electrical angle by using a single parameter ΔId, the embodiment is able to more appropriately set gains k1, k2 than the conventional method using a plurality of parameters. The other reason is that the embodiment reduces the electrical angle determination error by omitting the torque current error ΔIq, which is relatively great. By changing the content of the electrical angle determination as described above, the motor control apparatus of the embodiment advantageously improves the determination precision while using the same existing hardware construction.

This embodiment determines an electrical angle by using a proportional term and an integral term of the error ΔId occurring in the d-axis current as expressed in the equation (19) instead of using the equations (5) and (6). The reasons why the d-axis current can be used in the determination of an electromotive force instead of using the q-axis current as in the conventional art are stated above. Reasons why the use of the d-axis current makes it possible to realize stable control in which the electrical angle error converges and reasons why ΔId is adjusted in step S130 in FIG. 5 will be described below with reference to FIG. 7.

The graph of FIG. 7 indicates a relationship between the electrical angle error Δθ and the d-axis current error ΔId. Description will be made, taking for an example a curve (corresponding to p1, p2 in FIG. 7) where the required torque is not subjected to magnetic saturation. In a curve in which magnetic saturation is not involved, Δθ and ΔId have a monotonously increasing relationship near the origin point. If the proportional term and the integral term of the error ΔId are used in electrical angle determination, greater errors ΔId make greater amounts of correction of the electrical angle error Δθ, and less errors ΔId make less amounts of correction of the electrical angle error Δθ. If the gains k1, k2 in the proportional term and the integral term are appropriately set, it becomes possible to adjust the electrical angle error Δθ in the positive direction if an error ΔId occurs in the negative direction and to adjust the electrical angle error Δθ in the negative direction if an error ΔId occurs in the positive direction. As a result, it becomes possible to converge the electrical angle error Δθ to zero in accordance with a change in the error ΔId. Therefore, the motor operation can be controlled in a stable manner.

If magnetic saturation occurs, the intercept of the curve shifts from zero to greater extents with increases in the required torque, as can be seen with reference to the curves corresponding to points p3, p4 in FIG. 7. The gradient of the curve also changes although the change is small. If the intercept is apart from zero, execution of the control using the proportional term and the integral term of the error ΔId results in a stabilized state in which the error ΔId is zero, that is, in which the electrical angle error Δθ has a predetermined deviation. In the embodiment, however, occurrence of a deviation in the electrical angle error Δθ in the region of magnetic saturation is prevented by performing correction in step S130 in FIG. 5 in such a manner that the curve of the error ΔId passes through the origin point of the graph of FIG. 7.

It is desirable in a strict sense to vary the values of the gains k1, k2 in accordance with the gradient of the curve of ΔId. However, it is also possible to fix the gain k1, k2 without impeding the convergence of the electrical angle error Δθ as long as the curve of ΔId is a monotonously increasing curve. In the embodiment, such changes in the gradient of the curve are relatively small, so that fixation of the gains k1, k2 still allows sufficiently stable motor control.

The embodiment adjusts the error ΔId in step S130 in FIG. 5 considering a case where the motor is operated in the region of magnetic saturation. However, it is also possible to omit the process of adjusting the error ΔId, for example, in a case where the magnetic saturation is unlikely.

C. Second Embodiment

Figure 10:
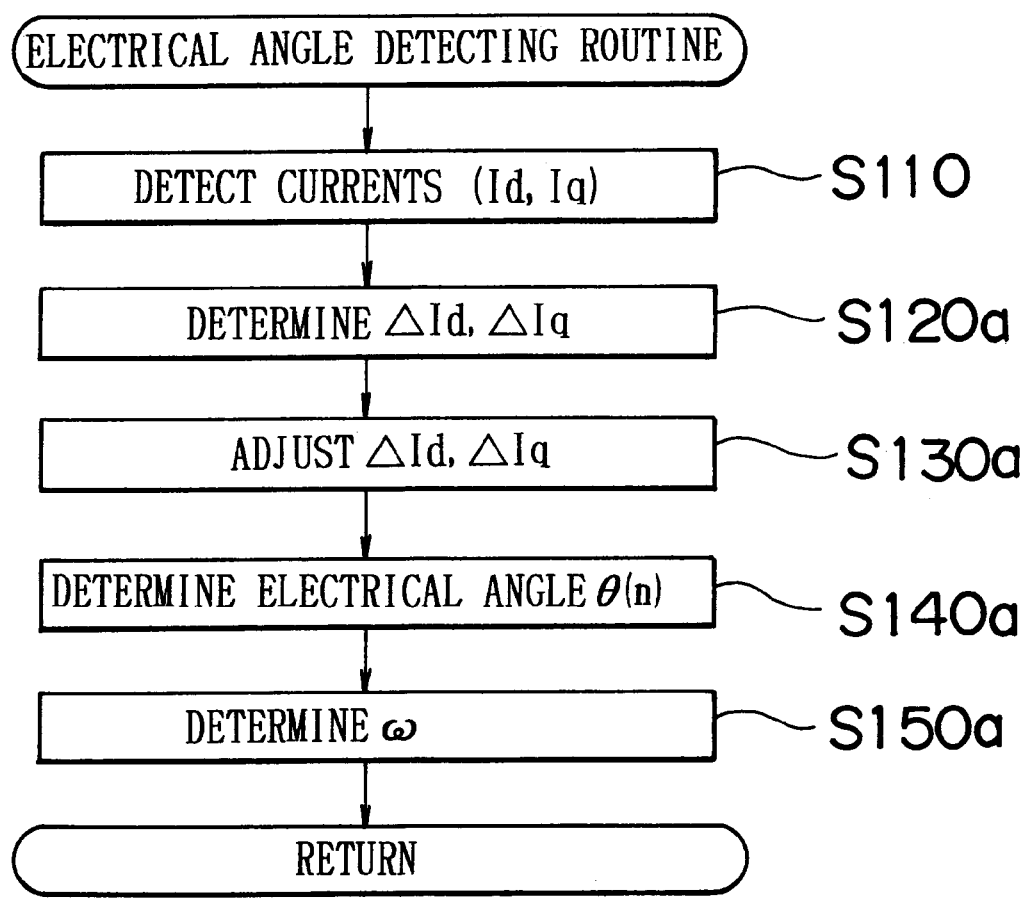
FIG. 10 is a flowchart illustrating an electrical angle detecting routine according to a second embodiment of the invention.

A second embodiment of the invention will be described. A motor control apparatus according to the second embodiment has substantially the same hardware construction as in the first embodiment (see FIGS. 1 and 2). The motor control routine in the second embodiment is also substantially the same as the routine of the first embodiment illustrated by the flowchart of FIG. 4. The second embodiment differs from the first embodiment in the electrical angle detecting routine. FIG. 10 is a flowchart illustrating an electrical angle detecting routine according to the second embodiment. The content of the electrical angle detecting process will be described below with reference to the flowchart of FIG. 10.

As is the case with the first embodiment, at a time point at which the electrical angle detecting routine is started, the CPU 120 has set a model value θc (see FIG. 3) as an estimated electrical angle based on the control operations that the CPU 120 has performed up to that time point. Current in accordance with a required torque has come to flow through the coils 32 due to the control operations performed up to the time point. In step S120a, the CPU 120 detects a d-axis current Id and a q-axis current Id.

In the first embodiment, the CPU 120 determines ΔId in step S120. In the second embodiment, however, the CPU 120 determines ΔId by using the equations (17), (18) mentioned above in conjunction with the first embodiment, and determines ΔIq by using equations (21), (22) in step S120a in FIG. 10.

$$\Delta Iq = Iq(n) - Iqm \quad (21)$$

$$Iqm = Iq(n-1) + t(Vq - R \times Iq(n-1) + \omega \times Ld \times Id(n-1) - E(n-1))/Lq \quad (22)$$

In the equations, the variables represent values substantially in the same manner as in the first embodiment. For example, Iqm is a model value of the torque current, and E is an electromotive force.

Corresponding to the processing in step S130 in the first embodiment in FIG. 5, the CPU 120 adjusts ΔId, ΔIq in step 130a in FIG. 10 in the second embodiment. A table as described above in conjunction with the first embodiment is prepared also for ΔIq in the second embodiment. Using the tables, the CPU 120 adjusts ΔId and ΔIq. The correction method and the table setting method are substantially the same as in the first embodiment, and will not be described again. The correction method for correcting ΔId and ΔIq is not restricted by the use of the correction tables separate for ΔId and ΔIq, but may also employ a correction table using ΔId+ΔIq as a parameter, or a correction table using a α×ΔId+β×ΔIq as a parameter, or the like. This correction may be omitted if the current that flows through the coils is relatively small.

Subsequently in step S140a, corresponding to step 140 in the first embodiment, the CPU 120 determines an electrical angle θ(n) occurring at the present time from the previously detected electrical angle θ(n-1) by using equations (24), (25). In step S150a, the CPU 120 determines an angular speed ω and an electromotive force E(n) by using the equations (26), (27). The electrical angle θ(n), the angular speed ω and the electromotive force E(n) thus determined are used in the timing control described below.

$$\theta = \theta(n-1) + k21 \times PM + k22 \times \Sigma PM \quad (24)$$

$$PM = \Delta Id + \Delta Iq \quad (25)$$

$$\omega = (k21 \times PM + k22 \times \Sigma PM)/t \quad (26)$$

$$E(n) = E(n-1) - k23 \times \Delta Iq \quad (27)$$

where k21–k23 are experimentally determined gains.

Although the first embodiment uses ΔId as a parameter in the electrical angle determination, the second embodiment uses a parameter PM, that is, ΔId+ΔIq, in the electrical angle determination. The reasons for the use of such a parameter will be described below.

Figure 11:
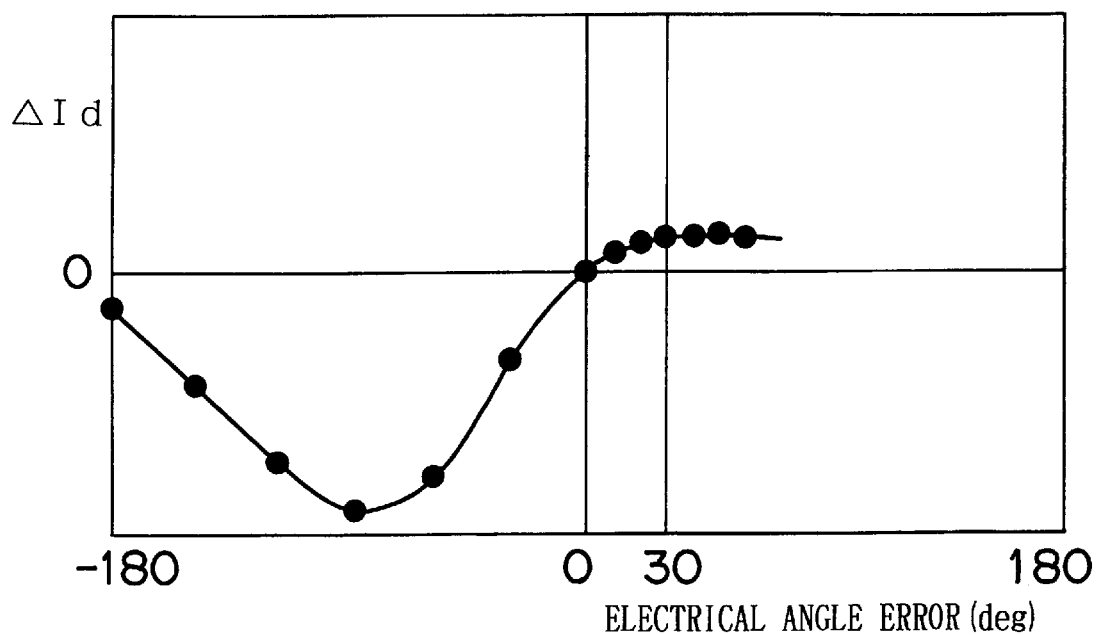
FIG. 11 is a graph indicating a relationship between the electrical angle error and the magnetizing current deviation $\Delta Id$.

FIG. 11 is a graph indicating a relationship between the error of the electrical angle and the deviation ΔId of the magnetizing current. Experimental results with regard to a motor according to the embodiment are indicated in the graph of FIG. 11. As the electrical angle increases from zero in the positive direction, the deviation ΔId of the magnetizing current gradually increases and reaches a substantially fixed value in a range of errors of 30 degrees or greater. For example, if the deviation ΔId of the magnetizing current alone is used as a parameter to detect an electrical angle, it becomes impossible to specify the amount of error in the range of errors equal to or greater than 30 degrees, so that high-precision detection of an electrical angle becomes impossible.

Figure 12:
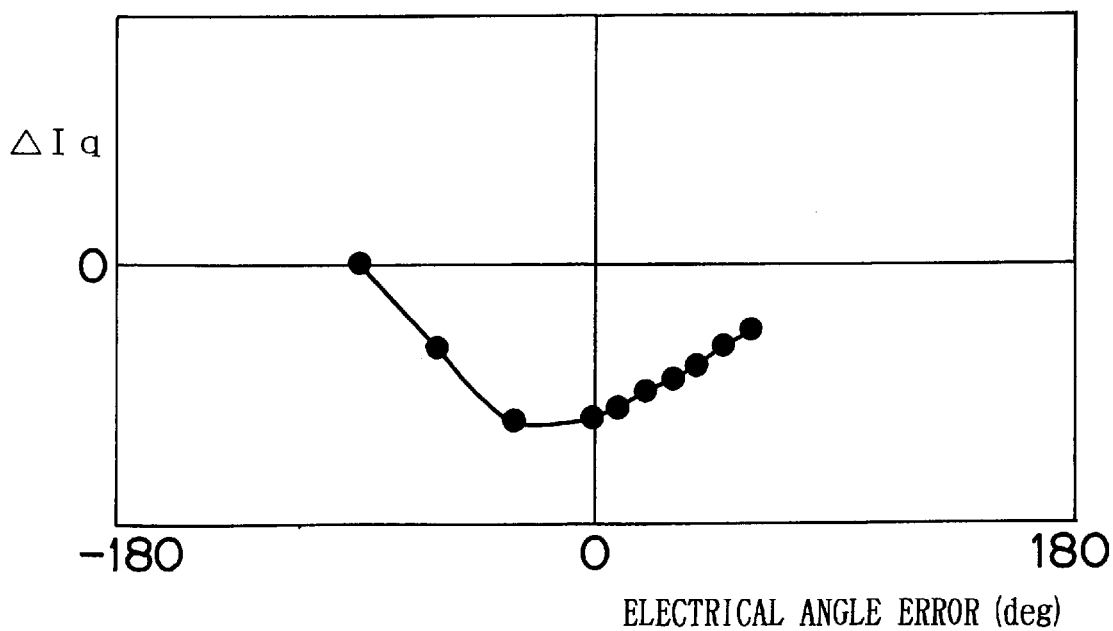
FIG. 12 is a graph indicating a relationship between the electrical angle error and the torque current deviation $\Delta Iq$.
Figure 13:
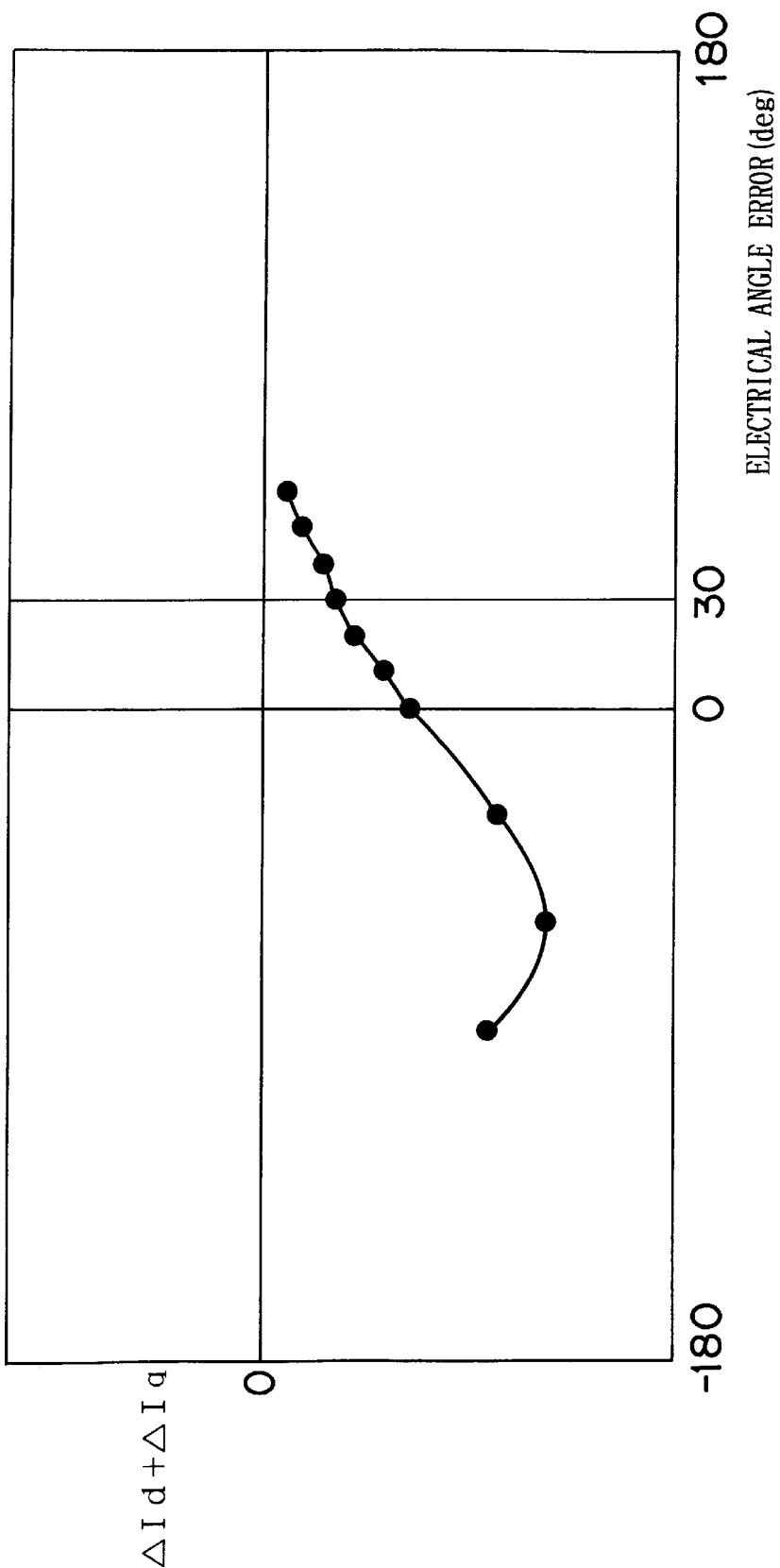
FIG. 13 is a graph indicating a relationship between the parameter $\Delta Id+\Delta Iq$ and the electrical angle error.

FIG. 12 is a graph indicating a relationship between the error of the electrical angle and the deviation ΔIq of the torque current. As indicated, the torque current deviation ΔIq exhibits a monotonously increasing tendency even if the electrical angle error increases in the positive direction. FIG. 13 is a graph indicating a relationship between the electrical angle error and the deviation ΔId+ΔIq. As indicated, the parameter ΔId+ΔIq also exhibits a monotonously increasing tendency based on the characteristic of ΔIq, even if the error angle becomes great.

Since the motor control apparatus of the second embodiment uses ΔId+ΔIq as a parameter in the electrical angle determination, the apparatus is able to detect an electrical angle with a high precision even if the electrical angle error temporarily becomes large due to noises or other effects. Therefore, the motor control apparatus of the embodiment makes it possible to control a motor in a stable manner even if the motor is in an operating condition in which the detected electrical angle is likely to have a large error, for example, an operating condition in which the motor operation relatively frequently fluctuates.

Figure 14:
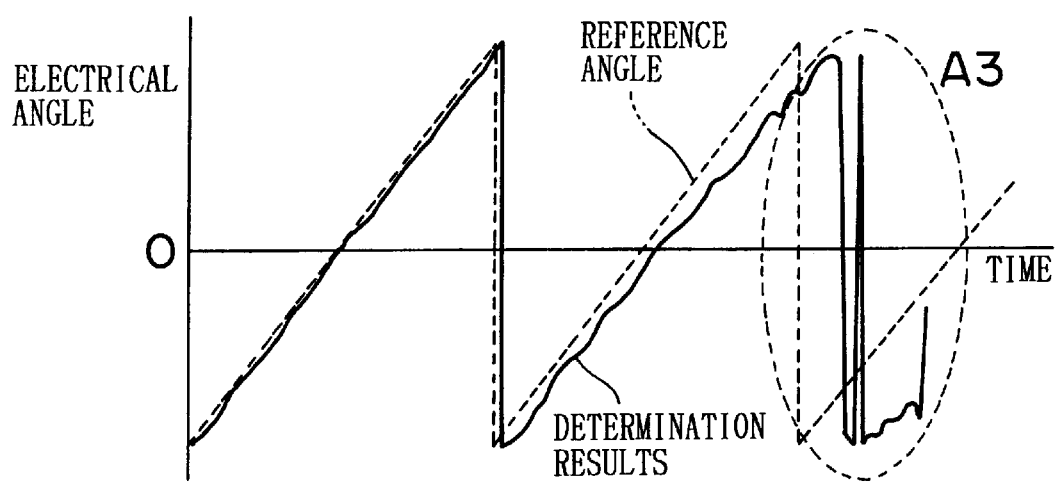
FIG. 14 is a graph indicating results of the electrical angle determination using $\Delta Id$ as a parameter.

FIG. 14 is a graph indicating results of the electrical angle determination performed by using ΔId as a parameter. In the graph, the solid line indicates results of the electrical angle determination, and the broken line indicates true values of electrical angle. The graph indicates a characteristic achieved when the electrical angle error is temporarily fluctuated to a great extent by adding a noise. In the graph of FIG. 14, the determined value of electrical angle greatly fluctuates in a region A3 and fails to follow the true value in that region. In such a region, it is impossible to control the motor in a stable manner.

Figure 15:
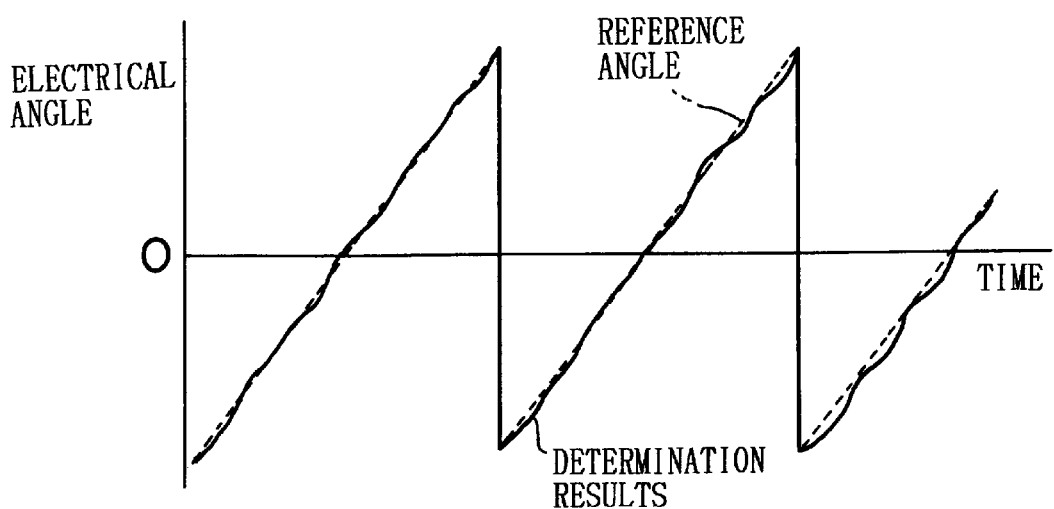
FIG. 15 is a graph indicating results of the electrical angle determination using $\Delta Id+\Delta Iq$ as a parameter.

FIG. 15 is a graph indicating results of the electrical angle determination performed by using ΔId+ΔIq as a parameter. Similar to FIG. 14, FIG. 15 shows a characteristic achieved when the electrical angle error is temporarily fluctuated to a great extent by adding a noise. As indicated by the graph of FIG. 15, the use of ΔId+ΔIq as a parameter achieves good coincidence between the determined values of electrical angle and the true values thereof. Therefore it is possible to control the motor in a stable manner even after the error has become great.

The motor control apparatus of the second embodiment is able to determine an electrical angle by using the only parameter PM. Therefore, as in the first embodiment, the coefficient in the equation (24) can easily be set to an appropriate value, so that the electrical angle can be detected with a high precision. Although in the equation (27), an electromotive force is determined by using ΔIq as a parameter, it is also possible to use the parameter PM in the determination of an electromotive force. This modification facilitates the setting of a gain.

The second embodiment uses ΔId+ΔIq as a parameter. However, instead of using this parameter, any other parameter that exhibits a monotonously increasing tendency or a monotonously decreasing tendency relative to the error angle within a wide range may also be used in order to control a motor in a stable manner even if the electrical angle error becomes great. Considering the characteristics indicated in FIGS. 11 and 12, it is also possible to use a polynomial in which the coefficients of ΔId and ΔIq are set to various values. That is, after a parameter is set in the form of α×ΔId+β×αIq, the coefficients α, β can be set to various values. Generally, ΔIq tends to have a greater error than ΔId. Therefore, if the value set as the coefficient β of ΔIq is reduced within such an extent that the monotonous increase characteristic is maintained, the precision in detecting an electrical angle can be further improved.

D. Third Embodiment

A motor control apparatus according to a third embodiment of the invention will be described. The motor control apparatus of the third embodiment has substantially the same hardware construction as that of the first embodiment (see FIGS. 1 and 2). The motor control routine (FIG. 4) in the third embodiment is also substantially the same as that in the first embodiment. The electrical angle detecting routine in the third embodiment is substantially the same as that in the second embodiment (FIG. 10), except that arithmetic expressions used in the routine are different. Features distinguishing the third embodiment different from the second embodiment will be described below.

Although in the second embodiment, ΔIq is calculated by using the equations (21), (22), the third embodiment uses equations (28), (29) to calculate ΔIq.

$$\Delta Iq = Iq(n) - Iqm \quad (28)$$

$$Iqm = Iq(n-1) + t(Vq - R \times Iq(n-1) - \omega \times Ld \times Id(n-1)/Lq \quad (29)$$

The equation (29) in the third embodiment differs from the equation (22) used in the second embodiment in that the equation (29) does not have a term of electromotive force E. The reasons for avoiding the electromotive force F will be stated below.

After ΔId and ΔIq are corrected by a method substantially the same as that used in the first and second embodiments, an electrical angle θ(n) at the present time point is determined in step S140a by using the equations (24), (25) as in the second embodiment. Subsequently in step S150a, ω is determined by using the equation (26) as in the second embodiment while omitting calculation of an electrical angle E(n). In the third embodiment, calculation of an electromotive force E is unnecessary since the electromotive force E is not used in the calculation of ΔIq as is apparent from the equation (29).

Figure 16A:
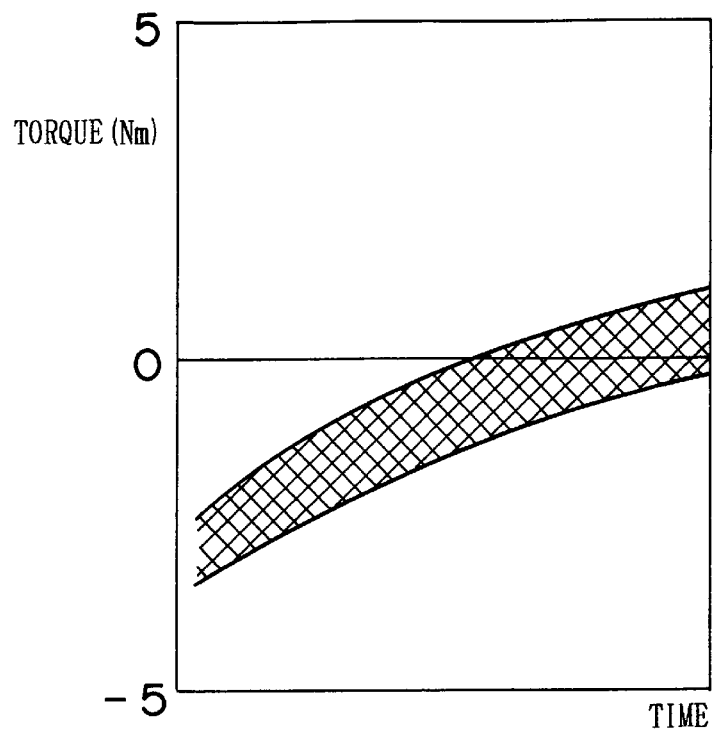
FIG. 16A is a diagram indicating changes in the output torque in a third embodiment.
Figure 16B:
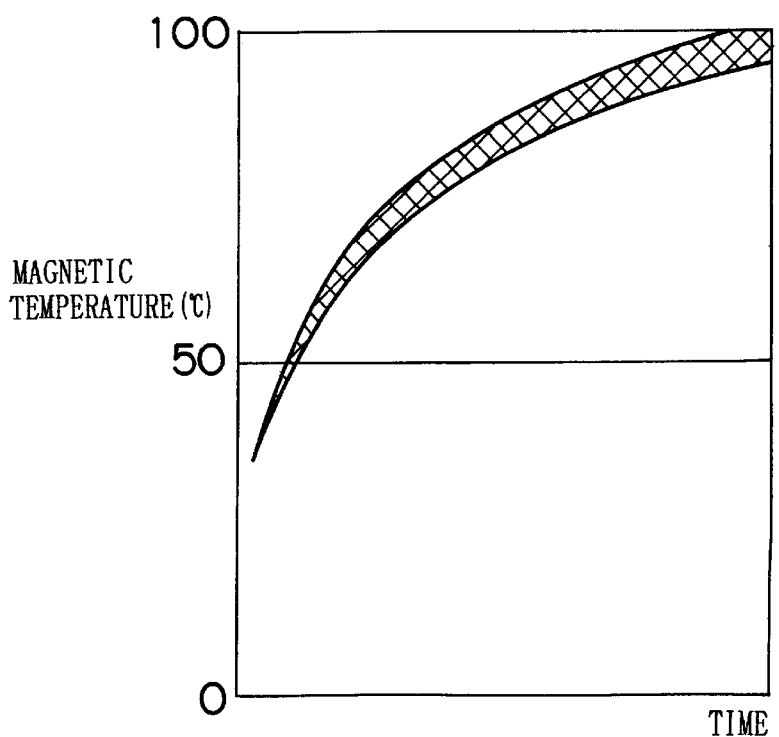
FIG. 16B is a diagram indicating changes in the magnet temperature in the third embodiment.
Figure 20A:
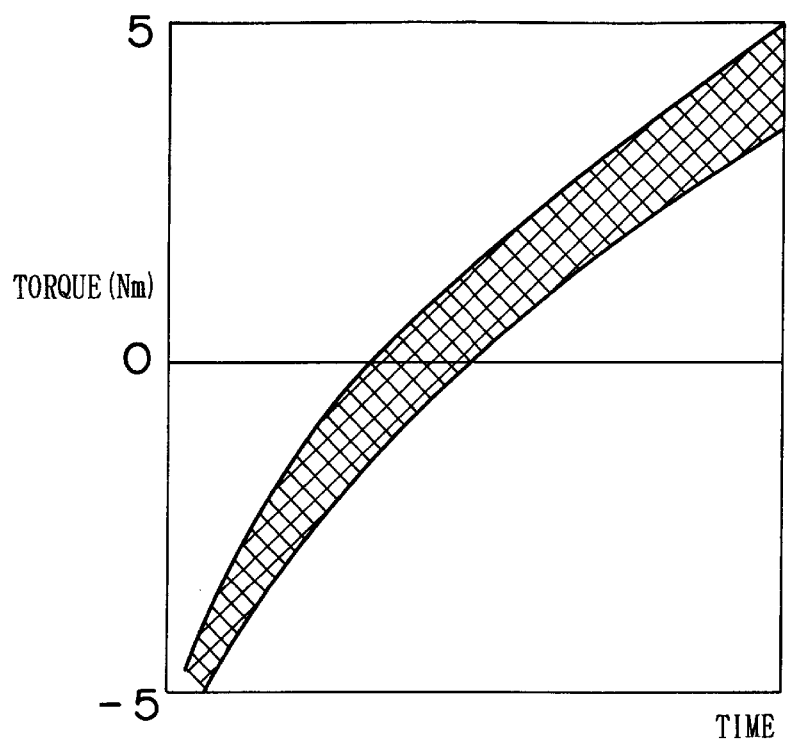
FIG. 20A is a diagram indicating over-time changes in the torque actually outputted from the motor when the motor is controlled at a predetermined rotational speed with a required torque being 0 Nm.
Figure 20B:
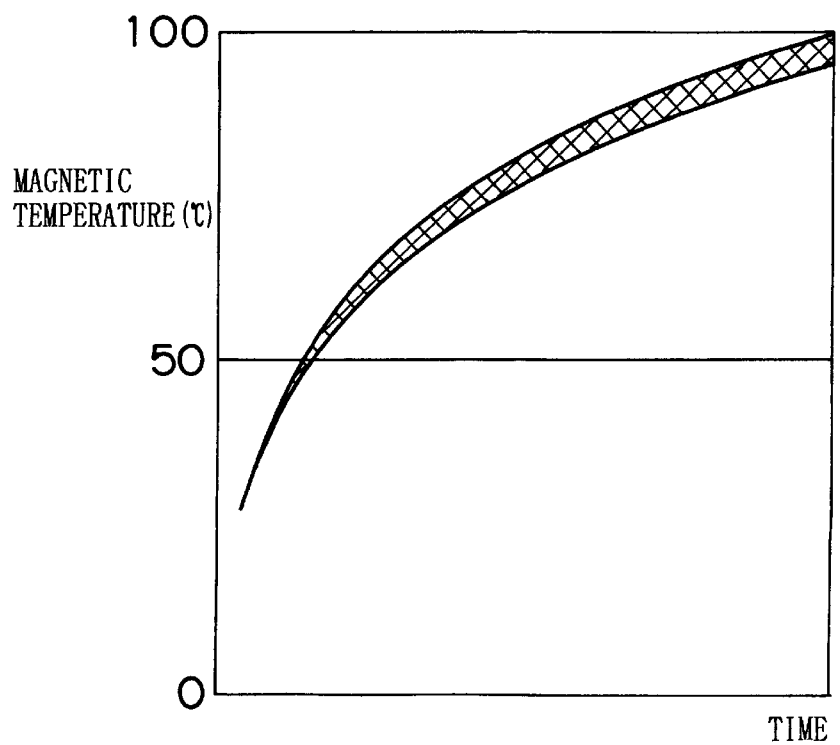
FIG. 20B is a diagram indicating changes in the permanent magnet temperature over time when the motor is controlled at the predetermined rotational speed with a required torque being 0 Nm.

The motor control apparatus of the third embodiment does not use the electromotive force E in the calculation of an electrical angle, so that the third embodiment achieves an advantage of reducing or substantially avoiding the effect of a change in the permanent magnet temperature. FIGS. 16A and 16B are diagrams indicating changes in the output torque and changes in the magnet temperature in the third embodiment. The diagrams indicates changes occurring under the same conditions as in the diagram of FIGS. 20A and 20B, which indicate changes in the output torque and the magnet temperature in a conventional art. In the conventional art as indicated in FIGS. 20A and 20B, as time elapses, the permanent magnet temperature rises, and the motor output torque greatly changes although the output torque is supposed to become equal to 0 Nm. In contrast, in the third embodiment, the fluctuation of the motor output torque is reduced, as indicated in FIGS. 16A and 16B. Therefore, the third embodiment improves the torque control precision by excluding from the calculation of an electrical angle a term of electromotive force, which is likely to be affected by changes in the permanent magnet temperature.

Although the third embodiment avoids using the term of electromotive force, the third embodiment does not suffer a considerable reduction in the electrical angle detection, in comparison with the second embodiment. FIG. 17 is a graph indicating electrical angle detection errors in the second and third embodiments, where the detection error in the second embodiment is indicated by a broken line and the detection error in the third embodiment is indicated by a solid line. As indicated, the electrical angle detection errors in both embodiments remain within the range of ±5 degrees, and are substantially comparable to each other. The reason why the electrical angle detection precision does not decrease in the third embodiment despite the omission of a term of electromotive force is not altogether clear. However, it can be considered that the term of electromotive force used in the second embodiment, which is likely to vary depending on changes in the permanent magnet temperature, may serve as a noise and therefore may reduce the electrical angle detection precision, and that because the term of electromotive force can be regarded as a function of the d-axis current as mentioned in conjunction with the first embodiment, the precision can be sufficiently improved by adjusting the parameters k21, k22 in the equation (24), and the like.

As is apparent from the above description, the motor control apparatus of the third embodiment is able to reduce or substantially avoid the effect of a change in the permanent magnet temperature occurring during operation of the motor without reducing the electrical angle detection precision. The omission of calculation of a counter electromotive force in the third embodiment correspondingly reduces the amount of calculation, and therefore allows an increase in the processing speed from the speed level in the second embodiment.

E. Fourth Embodiment

A motor control apparatus according to a fourth embodiment of the invention will be described. The motor control apparatus of the fourth embodiment has substantially the same hardware construction as in the second embodiment (see FIG. 1), except that the fourth embodiment has a thermister that serves as a temperature sensor for detecting the temperature of a permanent magnet in the motor 40. The permanent magnets are provided in the rotor 50, that is, a rotating member, as shown in FIG. 2. Therefore, the output from the thermister is transferred for detection via a slip ring and a brush.

Figure 18:
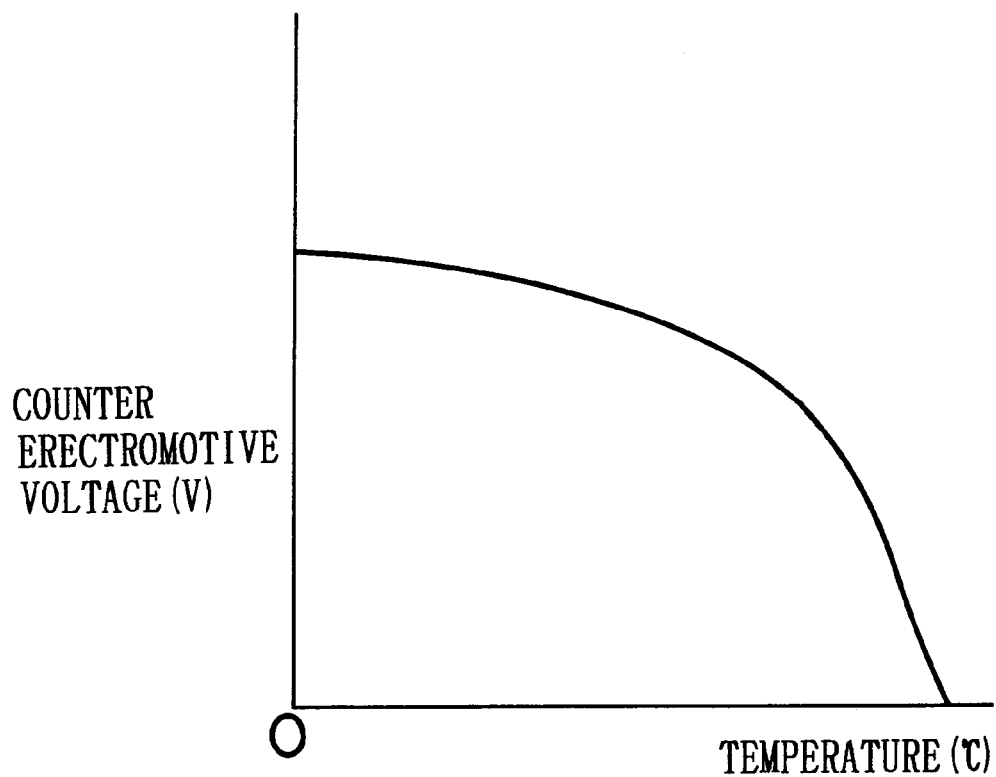
FIG. 18 is a diagram indicating a relationship between the counter electromotive force and the magnet temperature.

The control process in the fourth embodiment is substantially the same as that in the second embodiment (see FIG. 10), except calculation of an electromotive force E. Whereas the second embodiment detects an electromotive force E by using the equation (27), the fourth embodiment detects a current (step S110 in FIG. 10) and, in addition, detects a permanent magnet temperature by using the thermister, and determines an electromotive force E from the detected values by referring to a table. FIG. 18 is a diagram indicating a relationship between the counter electromotive force and the magnet temperature. The electromotive force E varies depending on the magnet temperature. Therefore, a table based on the relationship between the electromotive force and the magnet temperature can be prepared as indicated in FIG. 18. That is, the fourth embodiment determines an electromotive force E based on the result of detection by the thermister provided in the motor 40, by referring to the table indicated in FIG. 18, instead of evaluating the equation (27). The electromotive force E determined by using the table is used to calculate $\Delta Iq$ as in the equation (22).

As is apparent from the above description, the motor control apparatus of the fourth embodiment is able to determine an electromotive force E in accordance with the permanent magnet temperature by using the table as indicated in FIG. 18. Although the reference to the table may cause a disadvantage of increasing the amount of calculation required for determination of an electromotive force E, the reference to the table reduces or substantially avoids the effect of a change in the permanent magnet temperature, and therefore improves precision in the electrical angle detection and precision in the torque control. Although the fourth embodiment uses the table to determine an electromotive force E, it is also possible to use a pre-stored function that expresses a relationship between the electromotive force and the magnet temperature.

F. Application of Motor Control Apparatus

Figure 19:
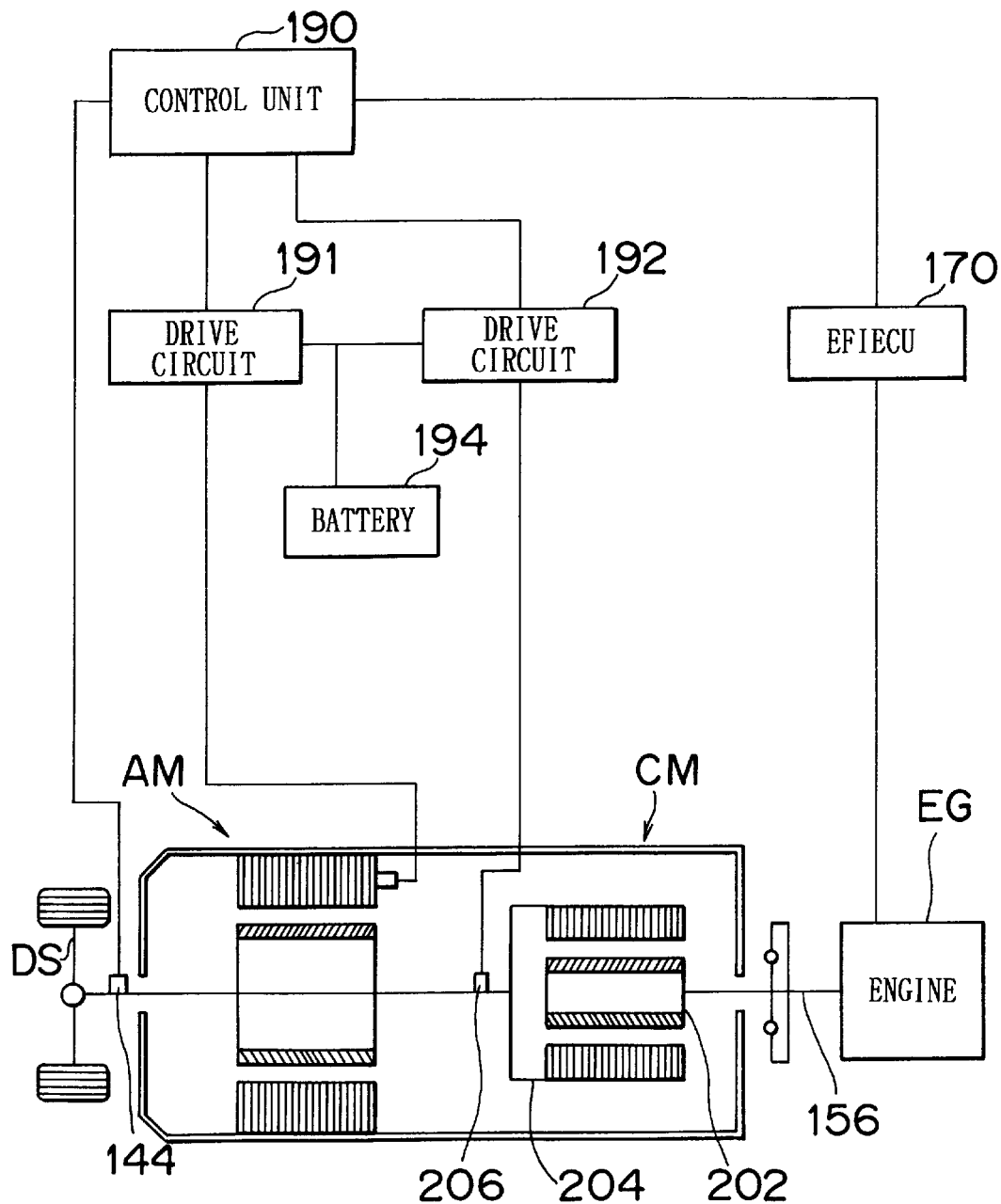
FIG. 19 is a schematic illustration of the construction of a hybrid car to which an embodiment of the invention is applied.

An exemplary application of the motor control apparatus of the foregoing embodiments and a motor employing the motor control apparatus will be described with reference to FIG. 19 in order to indicate the usefulness of the motor control apparatus and the motor. FIG. 19 is a schematic illustration of a hybrid car. The "hybrid car" refers to a vehicle employing an engine and an electric motor as drive sources. The hybrid car illustrated in FIG. 19 has a construction in which drive force from the engine can be directly transmitted to drive wheels. This type of hybrid car is termed parallel hybrid car.

The construction of the hybrid car shown in FIG. 19 will be briefly described. The power system of the hybrid car is substantially made up of an engine EG, a clutch motor CM, and an assist motor AM. The engine EG is a gasoline engine or a diesel engine used in an ordinary vehicle. The clutch motor CM is a pair-rotor electric motor in which an inner rotor 202 and an outer rotor 204 are rotatable relative to each other. The inner rotor 202 of the clutch motor CM is connected to a crankshaft 156 of the engine EG, and the outer rotor 204 is connected to an axle DS.

The assist motor AM and the clutch motor CM are driven by drive circuits 191, 192, respectively, while receiving electric power from a battery 194 or supplying power thereto. The operation of each motor is controlled by a control unit 190. The operation of the engine EG is directly controlled by an EFI-ECU 170, and is indirectly controlled by the control unit 190 outputting to the EFI-ECU 170 information needed to control the engine. Correspondence of these components to the components of the motor control apparatus 10 (shown in FIG. 1) is as follows. The control unit 190 corresponds to the motor-controlling ECU 100. The drive circuits 191, 192 correspond to the voltage applying portion 130. The motors CM, AM correspond to the three-phase synchronous motor 40. The components corresponding to the current sensors 102, 103, the filters 106, 107 and the ADCs 112, 113 are omitted from the illustration of FIG. 19. It is possible to apply either one of the first and second embodiments to the motor control apparatus.

In the hybrid car constructed as described above, a portion of the power from the engine EG is transmitted to the axle DS by the electromagnetic coupling of the inner rotor 202 and the outer rotor 204 of the clutch motor CM. The rotational speed of the crankshaft 156 is converted to a rotational speed required for the axle DS by controlling the relative sliding between the two rotors. The clutch motor CM regenerates a portion of the power into electric power through relative sliding between the rotors. The assist motor AM, when supplied with electric power, adds a torque so that the torque outputted to the axle DS becomes equal to a required torque. The electric power regenerated by the clutch motor CM is used for the torque adding operation of the assist motor AM. Thus, the hybrid car is able to convert the power from the engine EG so as to achieve a required rotational speed or a required torque and then output the thus-converted power, by using the clutch motor CM and the assist motor AM. Therefore, the hybrid car is able to operate the engine EG at a selected high-efficient point. The hybrid car can be driven in various drive modes. For example, the hybrid car can be driven by using only the power from the assist motor AM while the operation of the engine EG has been stopped.

In order to improve the ride quality and the operation efficiency of the hybrid car as described above, it is required that the clutch motor CM and the assist motor AM be appropriately controlled. It is also necessary to improve the reliability of the control devices for the clutch motor CM and the assist motor AM. It is also demanded to curb the cost of the vehicle. If the above-described motor control apparatus is applied to a hybrid car, the clutch motor CM and the assist motor AM can be controlled with high precision in a sensor-less manner. Therefore, it becomes possible to provide a hybrid car that achieves high reliability, good ride quality and good operation efficiency. Furthermore, this control can be realized while using a relatively low-cost circuit, so that the price of the hybrid car can be curbed. Therefore, the above-described motor control apparatus can be effectively used in a hybrid car.

As described above, the motor control apparatus of the invention is very useful in that the motor control apparatus makes it possible to appropriately operate a motor even if a relatively low-cost control circuit is used. Although a hybrid car is taken as an example in the above description, the application of the motor control apparatus of the invention is not limited to a hybrid car. On the contrary, the motor control apparatus of the invention is applicable to various apparatuses and machines employing synchronous motors, for example, railway vehicles, industrial machines and the like.

The foregoing embodiments may be adopted either separately or in combination. For example, the control according to the first embodiment and the control according to the second embodiments may be combined and selectively performed in accordance with the operating condition of a motor. As stated above, the first embodiment has an advantage that the embodiment reduces the amount of operation and is therefore suitable for high-speed operation. On the other hand, the second embodiment has an advantage that even if the estimated error of the electrical angle becomes great, the embodiment is able to perform stable control. Therefore, the first and second embodiments may be selectively used in accordance with the motor operating condition so as to fully enjoy the advantages of the two embodiments. It is also possible to change the various coefficients used in the control, in accordance with the operating condition.

While the present invention has been described with reference to what are presently considered to be preferred embodiments thereof, it is to be understood that the invention is not limited to the disclosed embodiments or constructions. To the contrary, the invention is intended to cover various modifications and equivalent arrangements. For example, the various processes and operations described above in conjunction with the embodiments may be realized partially or entirely by hardware. In particular, since the invention uses a single parameter in the electrical angle determination, an electrical angle determining circuit can be relatively easily formed.

What is claimed is:

1. An electrical angle detecting apparatus that detects an electrical angle that indicates an electrical rotational position of a rotor of a synchronous motor, comprising:

an electrical angle estimator that estimates an electrical angle of the rotor at a predetermined timing as a model value;

a voltage applicator that applies a predetermined voltage to a coil of the synchronous motor on a basis of the estimated electrical angle;

a detector that detects a current that flows through the coil in accordance with the voltage applied thereto, as a magnetizing current in a direction along a magnetic flux of the rotor and a torque current in a direction that is electrically perpendicular to the magnetic flux of the rotor; and an electrical angle determination device that determines a true value of the electrical angle based on an operation expression employing a single parameter that includes at least a deviation between a value of the magnetizing current detected by the detector and a model value of the magnetizing current determined based on a voltage equation that gives a relationship among a voltage across the coil of the synchronous motor, a current through the coil, and an inductance of the coil.

2. An electrical angle detecting apparatus according to claim 1, wherein the electrical angle determination device determines the true value of the electrical angle by using a proportional term in which the parameter is multiplied by a first coefficient and an integral term in which the parameter is multiplied by a second coefficient.

3. An electrical angle detecting apparatus according to claim 1, wherein the parameter is a deviation of the magnetizing current.

4. An electrical angle detecting apparatus according to claim 3, wherein the electrical angle determination device determines the true value θ of the electrical angle based on an expression below:

$$\theta=\theta(n-1)+k1\times\Delta Id+k2\times\Sigma(\Delta Id)$$

where:

$\Delta Id=Id(n)-Idm$;

$Idm=Id(n-1)+t(Vd-R\times Id(n-1)+\omega\times Lq\times Iq(n-1))/Ld$;

$\omega=(k1\times\Delta Id+k2\times\Sigma(\Delta Id))/t$;

Id(n) is a value of the magnetizing current at a given timing;

θ(n−1) is a value of the electrical angle at a timing previous to the given timing;

Idm is a model value of the magnetizing current;

ΔId is a deviation of the magnetizing current;

Id(n−1) is a value of the magnetizing current at the timing previous to the given timing;

Iq(n−1) is a value of the torque current at the timing previous to the given timing;

Ld is an inductance in a direction of the magnetizing current;

Lq is an inductance in a direction of the torque current;

R is a value of resistance of the coil;

Vd is a value of voltage in the direction of the magnetizing current;

t is a calculation executing period; and k1, k2 are coefficients;

ω—the motor operating angular speed.

5. An electrical angle detecting apparatus according to claim 1, wherein the parameter is a polynomial including a deviation of the magnetizing current and a deviation of the torque current.

6. An electrical angle detecting apparatus according to claim 5, wherein the electrical angle determination device determines the true value θ of the electrical angle based on an expression below:

$$\theta=\theta(n-1)+k1\times PM+k2\times\Sigma PM$$

where:

$PM=\Delta Id+\Delta Iq$;

$\Delta Id=Id(n)-Idm$ $Idm=Id(n-1)+t(Vd-R\times Id(n-1)+\omega\times Lq\times Iq(n-1))/Ld$;

$\Delta Iq=Iq(n)-Iqm$;

$Iqm=Iq(n-1)+t(Vq-R\times Iq(n-1)-\omega\times Ld\times Id(n-1)-E(n-1))/Lq$;

$\omega=(k1\times PM+k2\times\Sigma PM)/t$;

Id(n) is a value of the magnetizing current at a given timing;

θ(n−1) is a value of the electrical angle at a timing previous to the given timing;

Idm is a model value of the magnetizing current;

ΔId is a deviation of the magnetizing current;

Id(n−1) is a value of the magnetizing current at the timing previous to the given timing;

Iq(n) is a value of the torque current at the given timing;

Iqm is a model value of the torque current;

ΔIq is a deviation of the torque current;

Iq(n−1) is a value of the torque current at the timing previous to the given timing;

Ld is an inductance in a direction of the magnetizing current;

Lq is an inductance in a direction of the torque current;

R is a value of resistance of the coil;

E is an electromotive force created in the coil;

Vd is a value of voltage in the direction of the magnetizing current;

Vq is a value of voltage in the direction of the torque current;

t is a calculation executing period; and k1, k2 are coefficients;

ω—the motor operating angular speed.

7. An electrical angle detecting apparatus according to claim 6, wherein the synchronous motor is a permanent magnet type synchronous motor having at least one permanent magnet, and wherein the electrical angle determination device calculates a deviation of the torque current while avoiding using a term of an electromotive force produced by the at least one permanent magnet of the synchronous motor during operation of the synchronous motor, and determines the electrical angle based on the deviation of the torque current.

8. An electrical angle detecting apparatus according to claim 5, wherein the synchronous motor is a permanent magnet type synchronous motor having at least one permanent magnet, and wherein the electrical angle determination device calculates a deviation of the torque current based on an expression which does not include a term of an electromotive force produced by the at least one permanent magnet of the synchronous motor during operation of the synchronous motor, and determines the electrical angle based on the deviation of the torque current.

9. An electrical angle detecting apparatus according to claim 1, wherein the synchronous motor is a permanent magnet type synchronous motor having at least one permanent magnet, and wherein the electrical angle apparatus further comprises an electromotive force storage device that stores, beforehand, a fluctuation of the electromotive force produced by the at least one permanent magnet during operation of the synchronous motor, the fluctuation being caused depending on a temperature of the at least one permanent magnet, and a temperature detector that detects the temperature of the at least one permanent magnet; and wherein the electrical angle determination device determines the electrical angle by compensating for the fluctuation of the electromotive force based on the temperature detected by the temperature detector, by referring to the electromotive force storage device.

10. An electrical angle detecting method for detecting an electrical angle that indicates an electrical rotational position of a rotor of a synchronous motor, comprising the steps of:

(a) estimating an electrical angle of the rotor at a predetermined timing as a model value;

(b) applying a predetermined voltage to a coil of the synchronous motor on a basis of the estimated electrical angle;

(c) detecting a current that flows through the coil in accordance with the voltage applied thereto, as a magnetizing current in a direction along a magnetic flux of the rotor and a torque current in a direction that is electrically perpendicular to the magnetic flux of the rotor; and (d) determining a true value of the electrical angle based on an operation expression employing a single parameter that includes at least a deviation between a value of the magnetizing current detected by the detector and a model value of the magnetizing current determined based on a voltage equation that gives a relationship among a voltage across the coil of the synchronous motor, a current through the coil, and an inductance of the coil.

11. A motor control apparatus that detects an electrical angle indicating an electrical rotational position of a rotor of a synchronous motor and, based on the electrical angle, controls the synchronous motor so that the motor operates at a required rotational speed and a required torque, comprising:

an electrical angle estimator that estimates an electrical angle of the rotor at a predetermined timing as a model value;

a current controller that achieves a magnetizing current flowing through a coil of the synchronous motor in a direction along a magnetic flux of the rotor and a torque current flowing through the coil in a direction that is electrically perpendicular to the magnetic flux of the rotor, by applying a voltage to the coil of the synchronous motor in accordance with the required torque on a basis of the estimated electrical angle;

a detector that detects the magnetizing current and the torque current;

an electrical angle determination device that determines a true value of the electrical angle based on an operation expression employing a single parameter that includes at least a deviation between a value of the magnetizing current detected by the detector and a model value of the magnetizing current determined based on a voltage equation that gives a relationship among a voltage across the coil of the synchronous motor, a current through the coil, and an inductance of the coil; and a reflector that reflects the true value of the electrical angle determined by the electrical angle determination device in estimation of an electrical angle at a next timing.

12. A motor control apparatus according to claim 11, further comprising a compensator that compensates for an effect caused on the parameter by magnetic saturation that occurs in the coil.

13. A motor control apparatus according to claim 12, wherein the compensator comprises:

a storage in which a fluctuation that is caused on the parameter in accordance with the required torque is pre-stored; and a adjuster that adjusts the parameter with reference to the storage.

* * * * *